(12) United States Patent
Hu et al.

(10) Patent No.: US 7,187,730 B1
(45) Date of Patent: Mar. 6, 2007

(54) METHOD AND APPARATUS FOR PREDICTING CCK SUBSYMBOLS

(75) Inventors: Guorong Hu, Sunnyvale, CA (US); Yungping Hsu, Cupertino, CA (US)

(73) Assignee: Marvell International Ltd., Hamilton (BM)

(*) Notice: Subject to any disclaimer, the term of this patent is extended or adjusted under 35 U.S.C. 154(b) by 951 days.

(21) Appl. No.: 10/252,138

(22) Filed: Sep. 19, 2002

Related U.S. Application Data

(63) Continuation-in-part of application No. 10/092,971, filed on Mar. 5, 2002.

(60) Provisional application No. 60/277,258, filed on Mar. 21, 2001, provisional application No. 60/368,865, filed on Mar. 29, 2002.

(51) Int. Cl.
*H03D 1/00* (2006.01)
*H03L 27/06* (2006.01)

(52) U.S. Cl. ........... 375/343; 375/341; 375/342; 375/133; 375/136; 375/141; 702/69; 702/70; 704/216; 704/217; 704/218

(58) Field of Classification Search ............ 375/233, 375/343, 150, 350, 219, 336, 140, 142, 135, 375/136; 702/69, 70; 704/216, 217, 218
See application file for complete search history.

(56) References Cited

U.S. PATENT DOCUMENTS

| | | | | |
|---|---|---|---|---|
| 3,729,684 | A * | 4/1973 | Shuda | 329/310 |
| 4,621,365 | A * | 11/1986 | Chiu | 375/149 |
| 5,615,230 | A | 3/1997 | Gunther et al. | |
| 5,636,247 | A | 6/1997 | Kamerman et al. | |
| 5,640,431 | A * | 6/1997 | Bruckert et al. | 375/344 |
| 5,719,899 | A * | 2/1998 | Thielecke et al. | 375/144 |
| 5,796,787 | A * | 8/1998 | Chen et al. | 375/326 |
| 5,841,813 | A | 11/1998 | Van Nee | |
| 5,844,947 | A * | 12/1998 | Cesari | 375/341 |
| 5,862,182 | A | 1/1999 | Atwater et al. | |
| 5,878,085 | A | 3/1999 | McCallister et al. | |
| 5,966,055 | A | 10/1999 | Knoedl, Jr. et al. | |
| 6,005,840 | A | 12/1999 | Awater et al. | |
| 6,233,273 | B1 | 5/2001 | Webster et al. | |
| 6,330,273 | B1 | 12/2001 | Hulbert et al. | |
| 6,345,067 | B1 | 2/2002 | Okamoto | |

(Continued)

OTHER PUBLICATIONS

Viterbi, Andrew J. et al., "Nonlinear Estimation of PSK-Modulated Carrier Phase with Application to Burst Digital Transmission", IEEE Transactions on Information Theory, IT-29(4), pp. 543-551, Jul. 1983.*

(Continued)

*Primary Examiner*—Mohammed Ghayour
*Assistant Examiner*—Qutub Ghulamali

(57) ABSTRACT

An apparatus and a method for symbol decoding of baseband data in a wireless communications network is disclosed, and specifically CCK subsymbol prediction and symbol demodulation that occurs at 5.5 Mbps or 11 Mbps. The apparatus is configured to demodulate or predict the data differently, depending on the modulation rate. If the data was modulated at 11 Mbps, the $\phi_3$ rotator is rotated through each of its possible phase values and symbol correlation takes four clock cycles to complete. If the data was modulated at 5.5 Mbps, $\phi_3$ is not rotated with a set value of 0 within the correlator architecture, thereby saving power and reducing symbol correlation and subsymbol prediction to a single cycle while in such transmission mode.

76 Claims, 13 Drawing Sheets

U.S. PATENT DOCUMENTS

| | | |
|---|---|---|
| 6,345,073 B1 | 2/2002 | Curry et al. |
| 6,347,112 B1 | 2/2002 | Lattard et al. |
| 6,363,104 B1 | 3/2002 | Bottomley |
| 2001/0038663 A1* | 11/2001 | Medlock ...................... 375/142 |
| 2002/0064209 A1* | 5/2002 | Turetzky et al. ............ 375/142 |
| 2002/0136274 A1* | 9/2002 | Proctor et al. ............... 375/142 |
| 2004/0184721 A1* | 9/2004 | Birmingham ................. 385/24 |

OTHER PUBLICATIONS

Kato, Shuzo et al., "XPSK: A New Cross-Correlated Phase-Shift Keying Modulation Technique", IEEE Transaction on Communication, pp. 701-707, May 1983.*

TA Wilkinson, AE Jones, "Minimization of the Peak to Mean Envelope Power Ratio of Multicarrier Transmission Schemes By Block Coding," VTC Chigago, Jul. 1995, 1995 IEEE.

Robert L. Frank, "Polyphase Complementary Codes," IEEE Transactions on Information Theory, vol. 26, Nov. 1980.

R. Sivaswamy, "Multiphase Complementary Codes," IEEE Transactions on Information Theory, vol. 24, No. 5, Sep. 1978.

Marcel J. E. Golay, "Complementary Series," IRE Transactions on Information Theory Apr.

Carl Andren, Mark Webster, "CCK Modulation Delivers 11Mbps for High Rate IEEE 802.11 Extension," Wireless Symposium/Portable by Design Conference Spring 1999.

IEEE Std 802.11b-1999, The Institute of Electrical and Electronics Engineers, Inc. New York, 2000.

Bob Pearson, "Complementary Code Keying Made Simple," Intersil, Application Note Nov. 2001 AN9850.2.

* cited by examiner

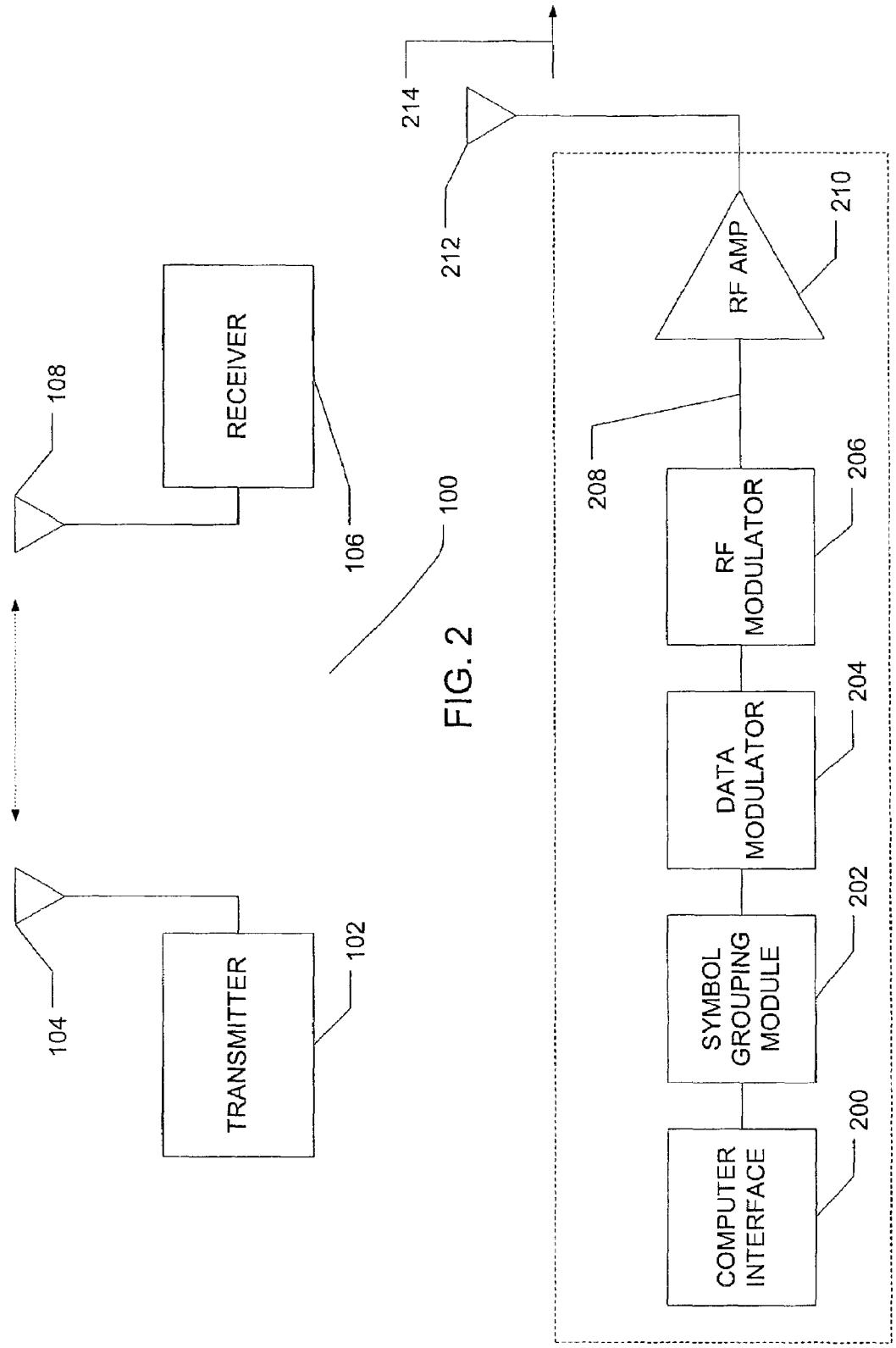

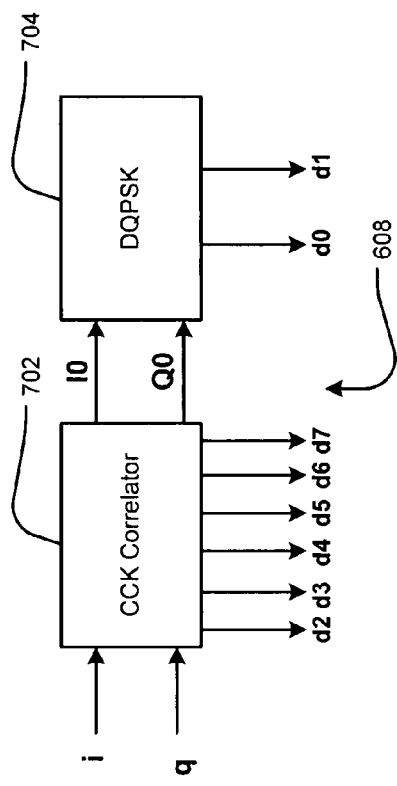
FIG. 7
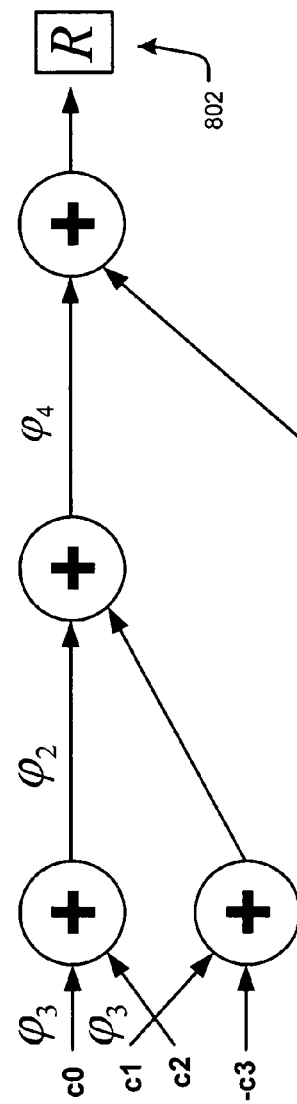
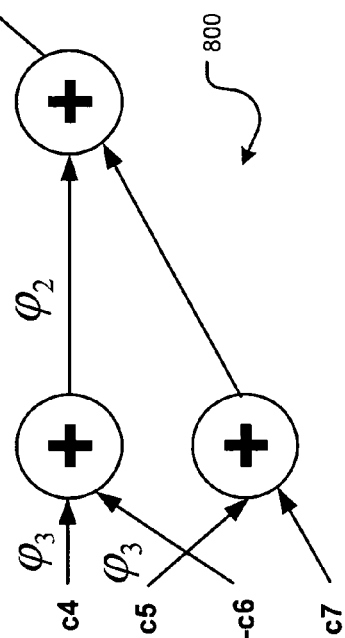
FIG. 8

METHOD AND APPARATUS FOR PREDICTING CCK SUBSYMBOLS

CROSS-REFERENCE TO RELATED APPLICATION

This application claims priority benefit of U.S. Provisional Patent Application Ser. No. 60/368,865 filed on Mar. 29, 2002 and is a continuation-in-part of U.S. patent application Ser. No. 10/092,971, filed on Mar. 5, 2002, which in turn claims priority benefit of U.S. Provisional Patent Application Ser. No. 60/277,258, filed on Mar. 21, 2001, the contents of each are collectively incorporated herein by reference.

BACKGROUND

1. Technical Field

This invention relates generally to wireless local area networks, and more particularly, to wireless local area networks employing physical layer modulation and demodulation in accordance with the IEEE Standard 802.11b—1999 Supplement ("IEEE802.11b") to the ANSI/IEEE Standard 802.11, 1999 edition.

2. Related Art

There are several known techniques for transmitting digital waveforms across wireless networks. One known technique is direct sequence spread spectrum (DSSS), which allows for high-rate modulation using complementary codes known as "spreading codes." The use of spreading codes enables the bandwidth occupied by a DSSS waveform to be increased or "spread." As a consequence of this bandwidth spreading (and despreading), DSSS systems are able to realize processing gains compared to systems using other transmission techniques.

Complementary Code Keying (CCK) is the modulation technique chosen for IEEE 802.11b high rate modes (5.5 Mbps mode and 11 Mbps mode). For example, a CCK modulated symbol c may be expressed as:

$$c = \{e^{j(\phi_1+\phi_2+\phi_3+\phi_4)}, e^{j(\phi_2+\phi_3+\phi_4)}, e^{j(\phi_1+\phi_2+\phi_4)}, -e^{j(\phi_1+\phi_4)}, e^{j(\phi_1+\phi_3)}, -e^{j(\phi_1+\phi_2)}, e^{j\phi_1}\} \quad (1)$$

where $\phi_1, \phi_2, \phi_3$ and $\phi_4$ are suitable phase values as described in more detail below.

For clarity of description, the chips in equation (1) are hereinafter referenced from left to right as c0–c7, respectively. In CCK modulation, the 4th and 7th chips, namely c3 and c6, are rotated 180° to optimize the correlation properties and reduce DC offset.

When operating in the 5.5 Mbps CCK mode (4 bits/symbol), the various phase values $\phi_1, \phi_2, \phi_3$ and $\phi_4$ employed in equation (1) are defined as shown below in equation (2).

$$\begin{cases} \varphi_1 = DQPSK \text{ encode with } (d0, d1) \text{ and even/odd} \\ \varphi_2 = (d2*2 + 1)*\pi/2 \\ \varphi_3 = 0 \\ \varphi_4 = d3*2*\pi/2 \end{cases} \quad (2)$$

where d0, d1, d2 and d3 are the 4 bits to be modulated.

When operating in the 11 Mbps CCK mode (8 bits/symbol), the various phase values are defined as shown below in equation (3).

$$\begin{cases} \varphi_1 = DQPSK \text{ encode with } (d0, d1) \text{ and even/odd} \\ \varphi_2 = (d2*2 + d3)*\pi/2 \\ \varphi_3 = (d4*2 + d5)*\pi/2 \\ \varphi_4 = (d6*2 + d7)*\pi/2 \end{cases} \quad (3)$$

where d0, d1, . . . , d6 and d7 are the 8 bits to be modulated.

When demodulating, the d2–d3 bits (5.5 Mbps mode) or the d2–d7 bits (11 Mbps mode) will be decoded by the CCK correlator, and d0–d1 by DQPSK demodulation.

The published CCK 64-vector correlation can be written as:

$$R = C^T \begin{bmatrix} e^{j(\varphi_2+\varphi_3+\varphi_4)} \\ e^{j(\varphi_3+\varphi_4)} \\ e^{j(\varphi_2+\varphi_4)} \\ e^{j\varphi_4} \\ e^{j(\varphi_2+\varphi_3)} \\ e^{j\varphi_3} \\ e^{j\varphi_2} \\ 1 \end{bmatrix}^* =$$

$$C^T \begin{bmatrix} e^{j\varphi_2} \\ & 1 \\ & & e^{j\varphi_2} \\ & & & 1 \\ & & & & e^{j\varphi_2} \\ & & & & & 1 \\ & & & & & & e^{j\varphi_2} \\ & & & & & & & 1 \end{bmatrix}^* \begin{bmatrix} e^{j\varphi_3} \\ & 1 \\ & & e^{j\varphi_3} \\ & & & 1 \end{bmatrix}^* \begin{bmatrix} e^{j\varphi_4} \\ & 1 \end{bmatrix}^*$$

where $C^T$=(c0, c1, c2, −c3, c4, c5, −c6, c7) (In-phase and Quadrature signal).

FIG. 1 depicts a CCK correlator architecture of the prior art. Only one phase or vector is shown for each of the $\phi$ values. It should be appreciated that the CCK correlator architecture depicted in FIG. 1 is capable of operating at either of 5.5 Mbps mode or 11 Mbps mode. As such, the actual hardware implementation and the time cost for both 5.5 Mbps and 11 Mbps modulation are the same, and therefore the power consumption is the same. In 5.5 Mbps modulation mode, $\phi_3$ is always equal to zero (see equation (2) above). Because the amount of real vector used for 5.5 Mbps modulation is less than the amount used for 11 Mbps modulation, the prior correlator wastes substantial power when operating at 5.5 Mbps and consumes as much power as is required for 11 Mbps operation.

Further, it has been proposed to further enhance CCK symbol modulation processing gain through decision feedback analysis based on e.g. previous symbol information and/or predicted subsymbol regeneration. Therefore, it would be desirable to implement power saving correlation techniques which could conveniently include decision-directed equalization using selective subsymbol prediction and regeneration for improving overall symbol correlation and demodulation.

SUMMARY

The present invention relates to a method and apparatus for a CCK correlator employing a reduced power consumption and achieves faster performance in the 5.5 Mbps mode of operation as compared with the 11 Mbps mode of operation, and can selectively predict and regenerate subsymbol information believed useful in e.g. decision feedback and noise error correction operations.

Consistent with an aspect of the present invention, a symbol prediction apparatus is disclosed which includes a correlator having an input to accept a first set of modulated symbol chips in a first order to generate a first set of correlator output signals based on the first plurality of modulated symbol chips, a data cross bar to selectively feed a second set of modulated symbol chips in a second order to the correlator based on one of a plurality of predicted subsymbol types, a windowing unit to selectively generate a subset of the set of correlator output signals based on the predicted subsymbol type, and a maximum picker unit to identify a maximum-valued correlator output signal from one of the set of correlator output signals and the subset of correlator output signals, wherein the maximum-valued correlator output signal corresponds to a predicted subsymbol of the predicted subsymbol type.

Other disclosed aspects of the present invention include a corresponding symbol prediction method, as well as wireless communications receiver and transceiver configurations which incorporate such selective sub symbol prediction and apparatus.

Additional aspects and advantages of this invention will be apparent from the following detailed description of certain embodiments thereof, which proceeds with reference to the accompanying drawings, in which like reference numerals indicate like parts.

BRIEF DESCRIPTION OF THE DRAWINGS

FIG. 2 shows one exemplary operating environment of the present invention;

FIG. 3 shows one exemplary embodiment of a data transmitter used in accordance with the present invention;

FIG. 7 shows data decoding structure for use in accordance with the principles of the present invention;

FIG. 8 shows a single-vector CCK correlator for use in accordance with one exemplary embodiment of the present invention;

DETAILED DESCRIPTION

Figure 1:
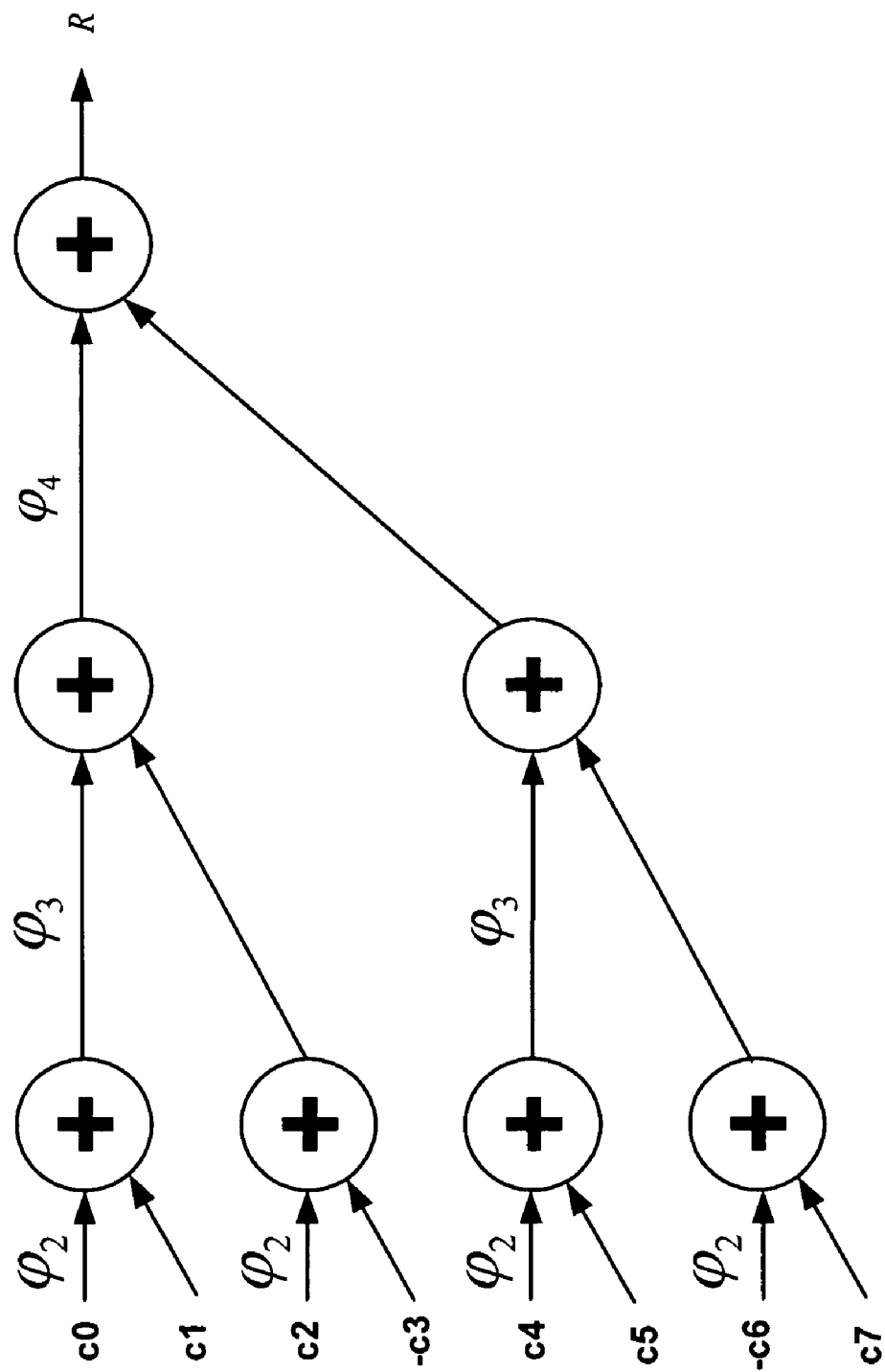
FIG. 1 shows a single vector CCK correlator of the prior art.

An exemplary operating environment for the illustrated system of the present invention is depicted in FIG. 2. Specifically, FIG. 2 depicts a wireless local area network 100 according to the present invention. A transmitter 102, an antenna 104, a receiver 106 and an antenna 108 are depicted. The transmitter 102 provides the data that is to be transmitted across antenna 104 to the receiver 106. The receiver 106 receives the transmitted data via antenna 108.

FIG. 3 depicts the transmitter 102 (FIG. 2) according to one embodiment of the present invention. Referring to FIG. 3, a computer interface 200, a symbol grouping module 202, a data modulator 204, a radio frequency modulator 206, a radio frequency signal 208, a radio frequency amplifier 210, and an antenna 212 are shown. The computer interface 200 provides a stream of binary data which represents information to be modulated and transmitted across the wireless local area network 100 (FIG. 2). The symbol grouping module 202 receives the stream of binary data from the computer interface 200 and divides the stream into a series of data words, with each data word representing a symbol value. The symbol values or data words from the grouping module 202 are then passed to the data modulator 204. The data modulator 204 modulates the data words into CCK modulated data that is compliant with the IEEE802.11b specifications. The CCK modulated data is then directed to the radio frequency (RF) modulator 206 which converts the CCK modulated data into a radio frequency signal. The radio frequency signal 208 is amplified by the radio frequency amplifier 210 such that it may be transmitted by antenna 212 as packets of data 214 (represented by an arrow in FIG. 3).

Figure 4:
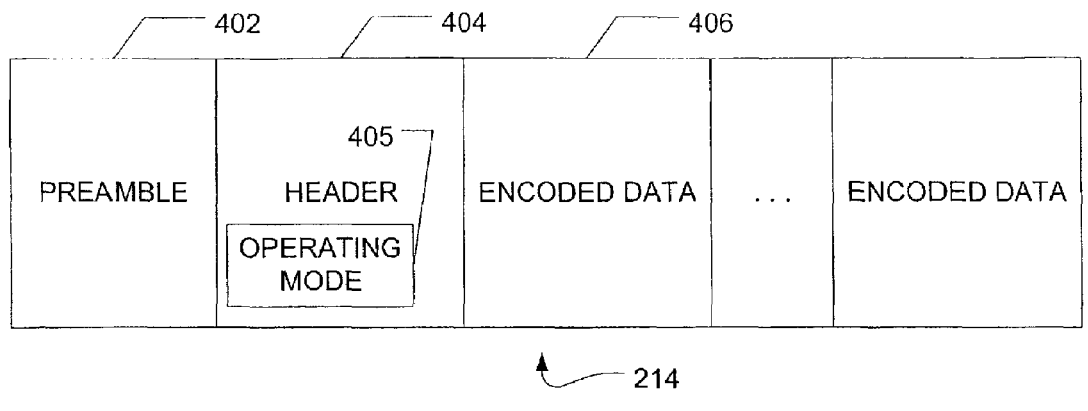
FIG. 4 shows one exemplary data structure used in accordance with the principles of the present invention.

Referring to FIG. 4, the packets of data 214 that are transmitted by the antenna 212 contain a preamble 402, a header 404, an operating mode indicator 405, and encoded data 406. The operating mode indicator 405, contained within the header 404, is an indication of whether the operating mode is DSSS 1 Mbps, DSSS 2 Mbps, CCK 5.5 Mbps or CCK 11 Mbps mode.

Encoding Data

Figure 5:
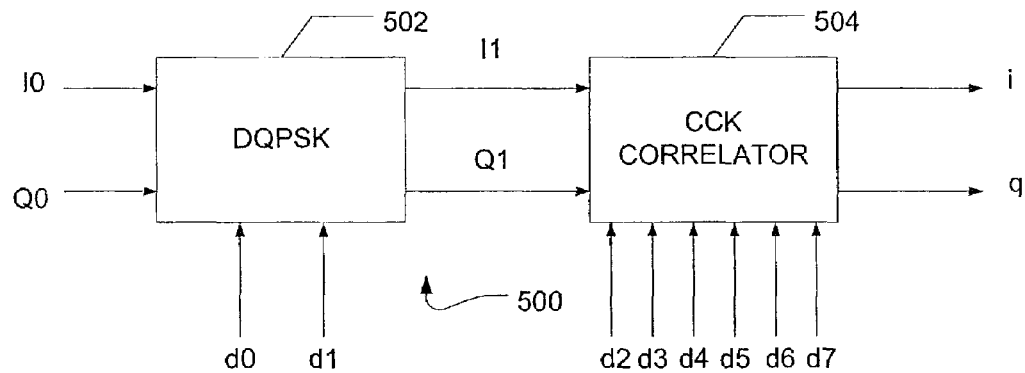
FIG. 5 shows an exemplary data encoding structure for use in accordance with the principles of the present invention.

Referring to FIG. 5, a CCK encoder 500 according to one exemplary embodiment of the present invention is depicted. The CCK encoder 500 includes a differential quadrature phase shift key (DQPSK) modulator 502 and a CCK correlator 504. The computer interface 200 (FIG. 3) outputs data bits d0–d3 (in 5.5 Mbps mode) or d0–d7 (in 11 Mbps mode). Regardless of whether the encoder 500 is operating in 5.5 Mbps mode or 11 Mbps mode, d0 and d1 are applied to the DQPSK modulator to encode the phase parameter $\phi_1$. DQPSK is well-known in the art. The phase parameter $\phi_1$ is determined based on the data bits d0 and d1 according to the table below:

| (d1, d0) | Phase (even symbols) | Phase (odd symbols) |
|---|---|---|
| 00 | 0 | B |
| 01 | B/2 | −B/2 |
| 10 | −B/2 | B/2 |
| 11 | B | 0 |

Data bits d2–d3 (5.5 Mbps) or d2–d7 (11 Mbps) are applied to the CCK correlator 504. The CCK correlator 504 receives the appropriate data bits (d2–d3 or d2–d7) and encodes the phase parameters $\phi_2$, $\phi_3$ and $\phi_4$ according to equation (2) or equation (3), respectively.

An even/odd rotator (not shown) may be utilized in the encoder 500 to output a signal that toggles between two different states. For even symbols, no rotation is applied to the phase value. For odd symbols, an additional rotation of B is applied to the phase value. By additionally encoding data with such a signal, effects of DC offset are reduced because any encoded symbol will have been encoded with a different odd/even status from the immediately preceding and following encoded symbols.

After the data bits have been applied to the CCK encoder 500, all of the phase parameters $\phi_1$, $\phi_2$, $\phi_3$ and $\phi_4$ will have been encoded. With all of the phase parameters thus being known, the phase parameter values may then be substituted into equation (1) to yield the eight-chip symbol. It should be noted that the symbol will contain eight complex chips, regardless of whether four data bits (5.5 Mbps) or eight data bits (11 Mbps) are used. The eight-chip symbol is then RF modulated by RF modulator 206, amplified by RF amplifier 210, and transmitted from antenna 212 (FIG. 3).

Encoding Example

As an example, if the CCK modulator 500 is operating in 5.5 Mbps mode and receives four data bits d3–d0 (MSB to LSB) {1, 0, 0, 1}, the output of the DQPSK modulator 502 will be B/2, and therefore $\phi_1$=B/2. $\phi_2$ is equal to (d2*2+1) *B/2 or (0*2+1)*B/2 which equals B/2. $\phi_3$ is defined as 0 in 5.5 Mbps mode. Finally, $\phi_4$ is equal to d3*2*B/2 or B. Thus {$\phi_1$, $\phi_2$, $\phi_3$, $\phi_4$} equals {B/2, B/2, 0, B}. Substituting those values into equation (1) yields the symbol c={$e^{j2B}$, $e^{jB/2}$, $e^{j2B}$, $-e^{j3B/2}$, $e^{jB}$, $e^{j3B/2}$, $-e^{jB}$, $e^{jB/2}$}. Euler's formula is provided below in equation (4):

$$e^{j\theta} = \cos\theta + j\sin\theta \quad (4)$$

Substituting the complex chip values for c (shown above) into equation (4) yields the complex symbol c={1, −j, 1, j, −1, −j, 1, j}. Thus it is apparent that any symbol to be transmitted may be derived through the use of the above equations.

Decoding Data

Figure 6:
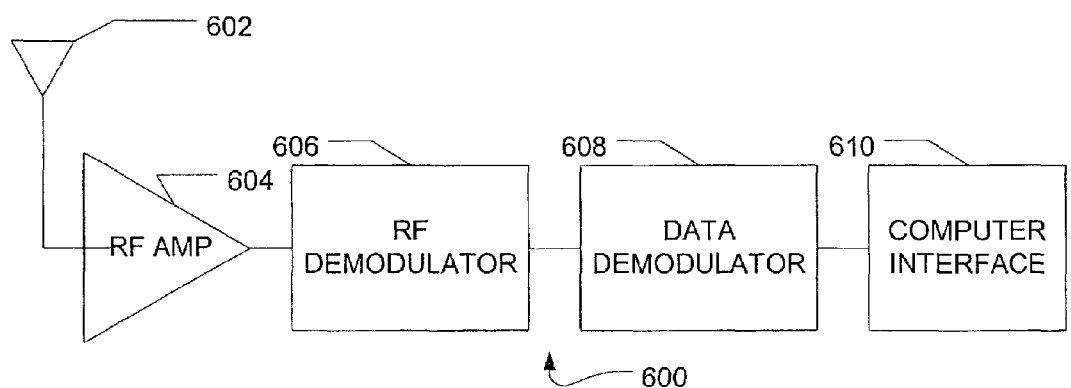
FIG. 6 shows one exemplary embodiment of a data receiver for use in accordance with the principles of the present invention.

FIG. 6 illustrates one exemplary embodiment of a receiver 600 (receiver 106 in FIG. 2) in accordance with the principles of the present invention. The receiver 600 includes an antenna 602, an RF amplifier 604, an RF demodulator 606, a data demodulator 608, and a computer interface 610. The encoded data packets transmitted by the antenna 212 (FIG. 3) are received by the antenna 602. The encoded data packets are applied to the RF amplifier 604 and the RF demodulator 606 to restore the data packets to a baseband signal. The data packets are then demodulated by the data demodulator 608 so that the original data from the computer interface 200 may be recovered.

Referring to FIG. 7, one exemplary embodiment of the data demodulator 608 (FIG. 6) is shown in further detail. The data demodulator 608 includes a CCK 64-vector correlator 702 and a DQPSK demodulator 704. The CCK 64-vector correlation implemented by the illustrated CCK correlator 702 can be written as:

$$R = \begin{bmatrix} c0 \\ c1 \\ c2 \\ -c3 \\ c4 \\ c5 \\ -c6 \\ c7 \end{bmatrix}^T \begin{bmatrix} e^{j(\varphi_2+\varphi_3+\varphi_4)} \\ e^{j(\varphi_3+\varphi_4)} \\ e^{j(\varphi_2+\varphi_4)} \\ e^{j\varphi_4} \\ e^{j(\varphi_2+\varphi_3)} \\ e^{j\varphi_3} \\ e^{j\varphi_2} \\ 1 \end{bmatrix}^* = \begin{bmatrix} c0 \\ c2 \\ c1 \\ -c3 \\ c4 \\ -c6 \\ c5 \\ c7 \end{bmatrix}^T \begin{bmatrix} e^{j(\varphi_2+\varphi_3+\varphi_4)} \\ e^{j(\varphi_3+\varphi_4)} \\ e^{j(\varphi_2+\varphi_4)} \\ e^{j\varphi_4} \\ e^{j(\varphi_2+\varphi_3)} \\ e^{j\varphi_3} \\ e^{j\varphi_2} \\ 1 \end{bmatrix}^* \quad (5)$$

The correlator output R may be expanded as shown below:

$$R = \begin{bmatrix} c0 \\ c1 \\ c2 \\ -c3 \\ c4 \\ c5 \\ -c6 \\ c7 \end{bmatrix}^T \begin{bmatrix} e^{j\varphi_3} & & & \\ 1 & & & \\ & e^{j\varphi_3} & & \\ & 1 & & \\ & & e^{j\varphi_3} & \\ & & 1 & \\ & & & e^{j\varphi_3} \\ & & & 1 \end{bmatrix} \begin{bmatrix} e^{j\varphi_2} \\ 1 \\ e^{j\varphi_2} \\ 1 \end{bmatrix}^* \begin{bmatrix} e^{j\varphi_4} \\ 1 \end{bmatrix}^*$$

A single-vector implementation of the CCK correlator described above is depicted in FIG. 8. It should be appreciated that because the correlator 800 depicted in FIG. 8 is a single-vector correlator, application of a particular combination of phase parameters $\phi_2$, $\phi_3$ and $\phi_4$ to the correlator 800 will yield a single output value R of the set of 64 possible correlator outputs values 802.

Figure 9:
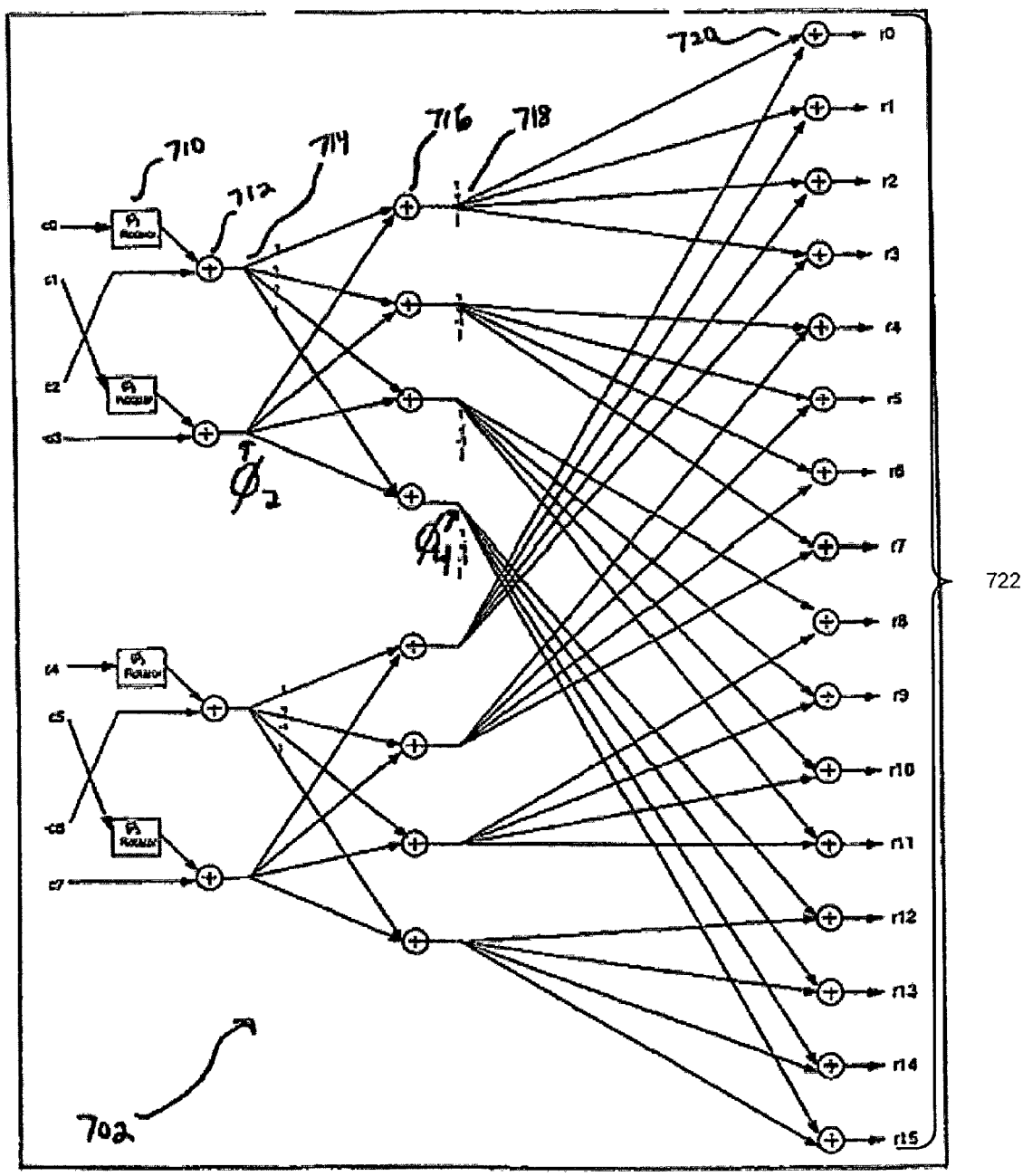
FIG. 9 shows a 64-vector CCK correlator for use in accordance with one exemplary embodiment of the present invention.

One exemplary embodiment of the 64-vector CCK correlator 702 according to the present invention is depicted in FIG. 9. The received symbol c, made up of chips c0–c7, is applied to the input of the correlator 702. It should be appreciated that, through the use of four different vector values for each of the phase parameters $\phi_2$, $\phi_3$ and $\phi_4$, 64 different correlator output values are possible (4*4*4=64). $\phi_3$ Rotator 710 is provided to rotate or cycle through the four possible values that $\phi_3$ may assume. Of course, it should be appreciated that $\phi_3$ may only assume four possible values when operating in 11 Mbps mode; in 5.5 Mbps mode, $\phi_3$ is fixed at a value of 0. Two terms are summed at summers 712. For example, a $\phi_3$ rotated value of c0 (i.e., c0*e^j$\phi_3$) is summed with c2, a $\phi_3$ rotated value of c1 is summed with −c3, etc. At 714, the four possible vectors of $\phi_2$(1, −j, −1, j) are applied to the output of the summers 712. Two terms corresponding to $\phi_2$ and $\phi_3$ that have been decomposed according to equation (5) are summed at summers 716. At 718, the four possible vector values of $\phi_4$ are applied to modify the outputs 718 of the summers 716. Finally, two terms corresponding to $\phi_2$, $\phi_3$ and $\phi_4$ that have been decomposed according to equation (5) are summed at summers 720. The output of the various summers 720 correspond to correlator outputs r0–r15 (i.e. outputs 722). Thus, for any given value of $\phi_3$, there will be sixteen possible correlator outputs 722 with an index [$\phi_2$, $\phi_4$].

When the correlator 702 is operating in 11 Mbps mode, four clock cycles will be required in order to generate the 64 possible outputs 722, i.e. 16 outputs 722 per clock cycle, with the $\phi_3$ Rotators 710 rotating once per clock cycle. When the correlator 702 is operating in the 5.5 Mbps mode, however, only one clock cycle will be required to generate all available outputs 722. This is because, in the 5.5 Mbps mode, $\phi_3$ may only assume the value 0, such that there is no need to rotate through other possible vector values. As a consequence of the correlator design of the present invention, the amount of power required for demodulating while operating at 5.5 Mbps is greatly reduced compared to the prior art correlators as described above. Further, the correlator of the present invention is appreciably faster, because there is no need to rotate through the other possible $\phi_3$ values.

Figure 10:
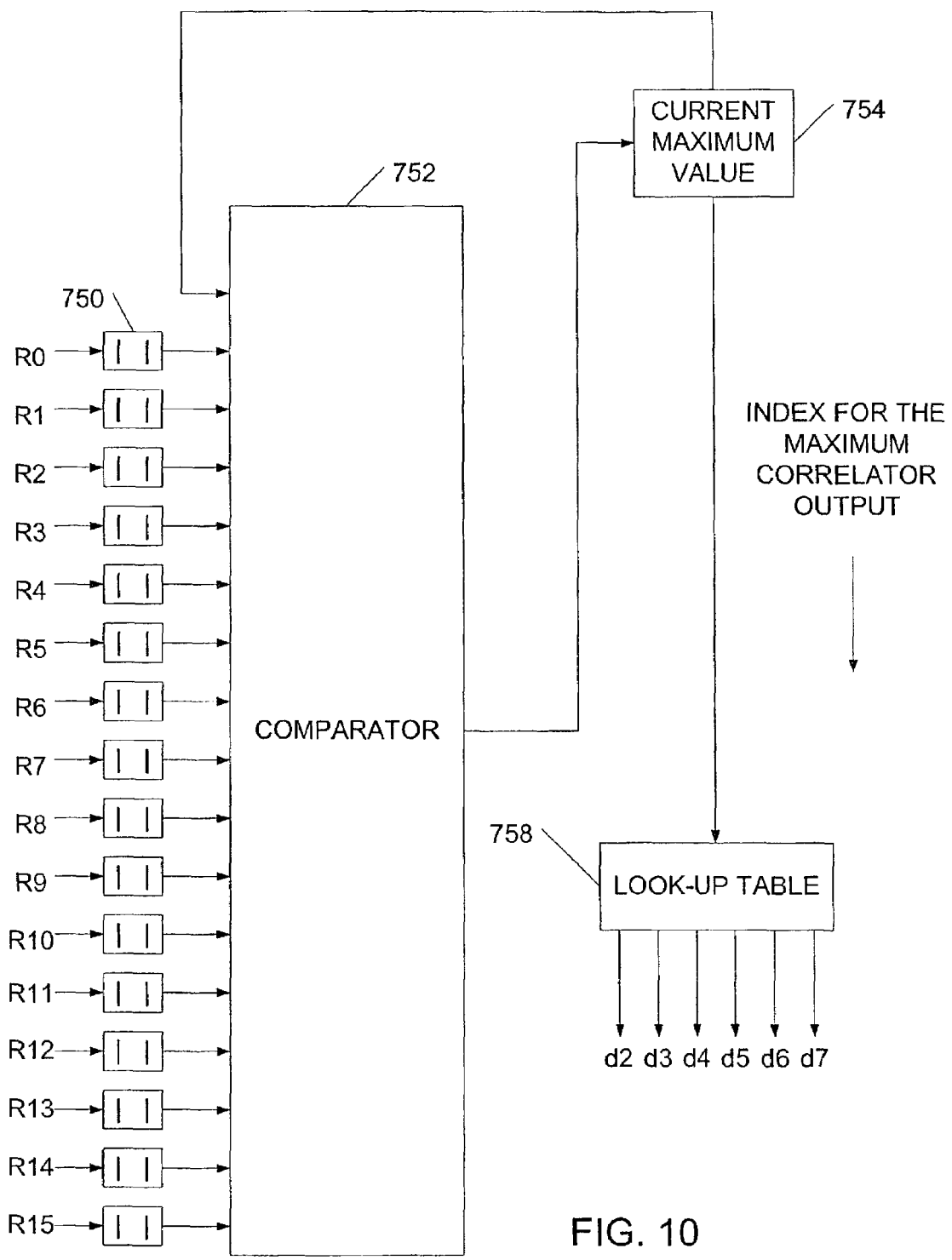
FIG. 10 shows structure for use in demodulating to recover at least some original data bits according to one exemplary embodiment of the present invention.

The correlator outputs 722 are analyzed to determine which of the outputs r0–r15 is of the greatest magnitude. Referring to FIG. 10, each of the correlator outputs 722 is applied to an absolute value module 750. The absolute value module 750 will output a value representative of the magnitude of the inputted correlator output r0–r15, respectively. The maximum value is held in a current maximum value module 754. The value in the current maximum value module 754 is preferably initialized to 0 such that the actual maximum correlator output 722 for the first iteration of phase rotations will be stored. The output of each absolute value module 750 and the current maximum value held in the current maximum value module 754 are compared. Thus, in one exemplary embodiment, 16 comparisons are performed (fifteen for the sixteen correlator outputs and one for the previous maximum value) for each of the four phase rotations of the $\phi_3$ rotator. If the correlator 702 is operating in 5.5 Mbps mode, then all of the possible correlator values will have been generated, and the maximum value of those output values will be known and stored in the current maximum value module 754. If the correlator 702 is operating in 11 Mbps mode, then $\phi_3$ will be rotated three times, spanning all four phase values, and the correlator 702 will generate 16 correlator output values with each rotation. Comparisons are performed for each of the rotations and the maximum value of those 64 correlator values will be stored in the current maximum value module 754. It should be appreciated by those skilled in the art that there are numerous other methods of determining the maximum value of a set of output values.

After determining the value of the maximum correlator output 722, the index of the CCK correlator 702 with a maximum value is mapped to the corresponding data values. Specifically, the original data values d2–d7 (11 Mbps) or d2–3 (5.5 Mbps) are determined through the use of an encoder, e.g. look-up table 758. Look-up table 758 outputs data bits that correspond to the correlator index that has the maximum correlator output value.

The maximum correlator output value is also used to determine data values d0–d1. This is done through DQPSK demodulation performed by DQPSK demodulation module 704 (FIG. 7).

The original data values d0–d3 (5.5 Mbps) or d0–d7 (11 Mbps) are then provided by the data demodulator 608 to the computer interface 610 (FIG. 6).

Figure 11:
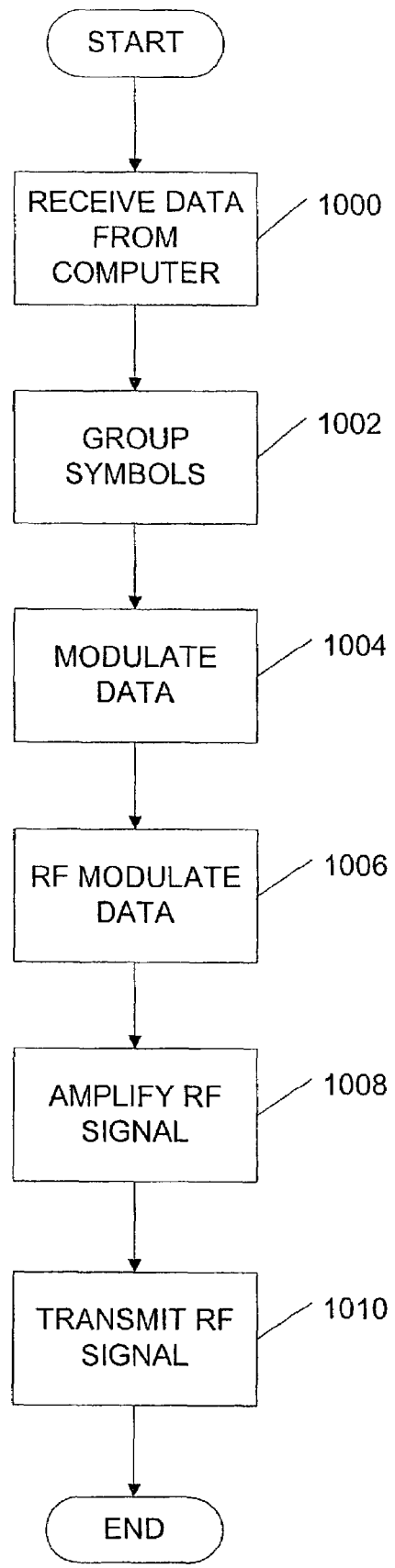
FIG. 11 shows a flow diagram depicting an exemplary transmission portion of one exemplary embodiment of the present invention.

FIG. 11 is a flow diagram depicting the transmission portion according to one embodiment of the present invention. In block 1000, data is received from a computer via the computer interface 200 (FIG. 3). The data is then grouped into symbols in block 1002 by the symbol grouping module 202 (FIG. 3). In block 1004, the data is modulated by the data modulator 204 (FIG. 3). The baseband modulated data is then RF modulated in block 1006 by the RF modulator 206 (FIG. 3). In block 1008, the RF signal is amplified by RF amplifier 210 (FIG. 3). Finally, the amplified RF signal is transmitted in block 1010 by antenna 212 (FIG. 3).

Figure 12:
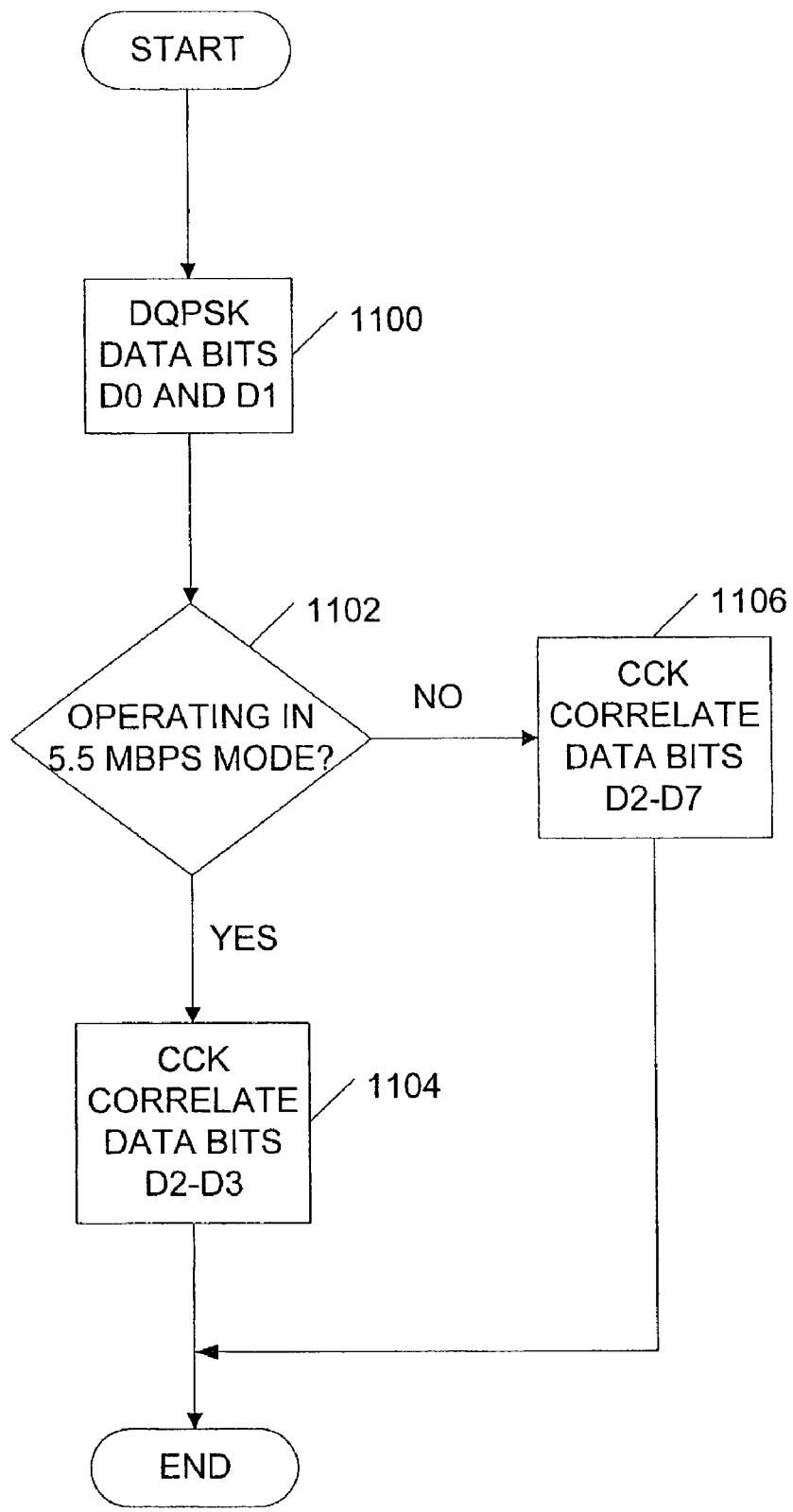
FIG. 12 shows a flow diagram depicting an exemplary encoding of data bits according to one exemplary embodiment of the present invention.

FIG. 12 is a flow diagram depicting the encoding or data modulation portion according to one exemplary embodiment of the present invention. In block 1100, data bits d0 and d1 are DQPSK encoded by the DQPSK encoder 500 (FIG. 5). A determination is then made as to whether the CCK encoder 500 is operating in 5.5 Mbps or 11 Mbps mode (block 1102.). An indication of the operating mode is stored in the header 404 (FIG. 4). If the CCK encoder 500 is operating in 5.5 Mbps mode, then, in block 1104, data bits d2–d3 are applied to the CCK correlator 504 (FIG. 5). It should be recognized that four bits are used in 5.5 Mbps encoding. If the CCK encoder 500 is operating in 11 Mbps mode, then, in block 1106, data bits d2–d7 are applied to the CCK correlator 504 (FIG. 5).

Figure 13:
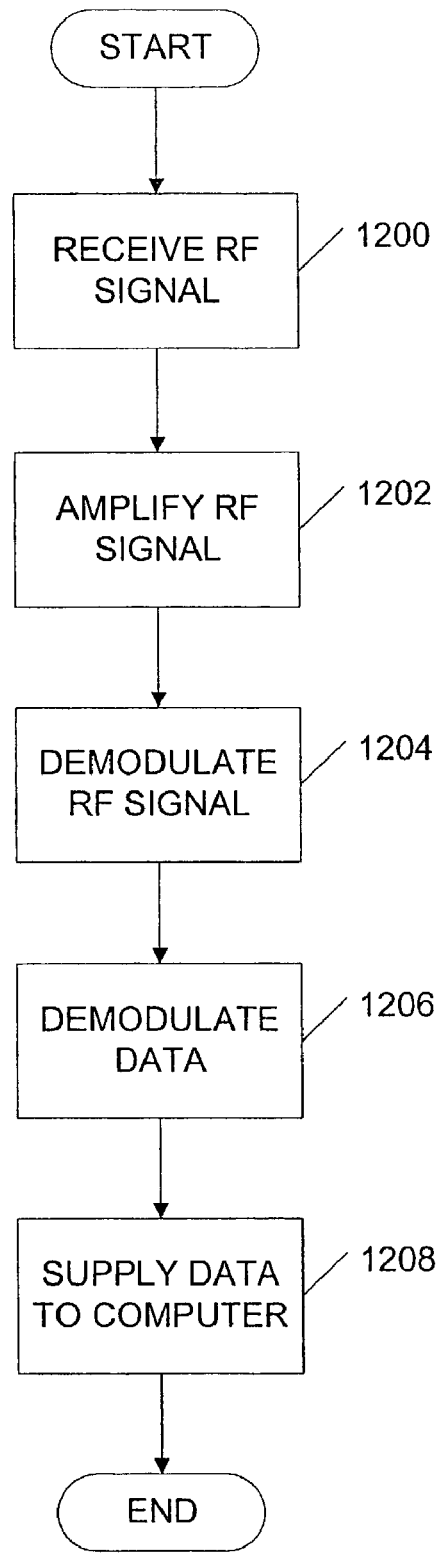
FIG. 13 shows a flow diagram depicting an exemplary receiving portion of one exemplary embodiment of the present invention.

FIG. 13 is a flow diagram depicting the receiving portion according to one embodiment of the present invention. At block 1200, the RF signal transmitted by antenna 212 (FIG. 3) is received by antenna 602 (FIG. 6). The RF signal is then amplified at block 1202 by RF amplifier 604 (FIG. 6). In block 1204, the amplified RF signal is demodulated by the RF demodulator 606 (FIG. 6). The demodulated RF signal is then in block 1206 demodulated by the data demodulator 608 (FIG. 6). In block 1208, the demodulated data is then supplied to a receiver computer (not shown) via computer interface 610 (FIG. 6).

Figure 14:
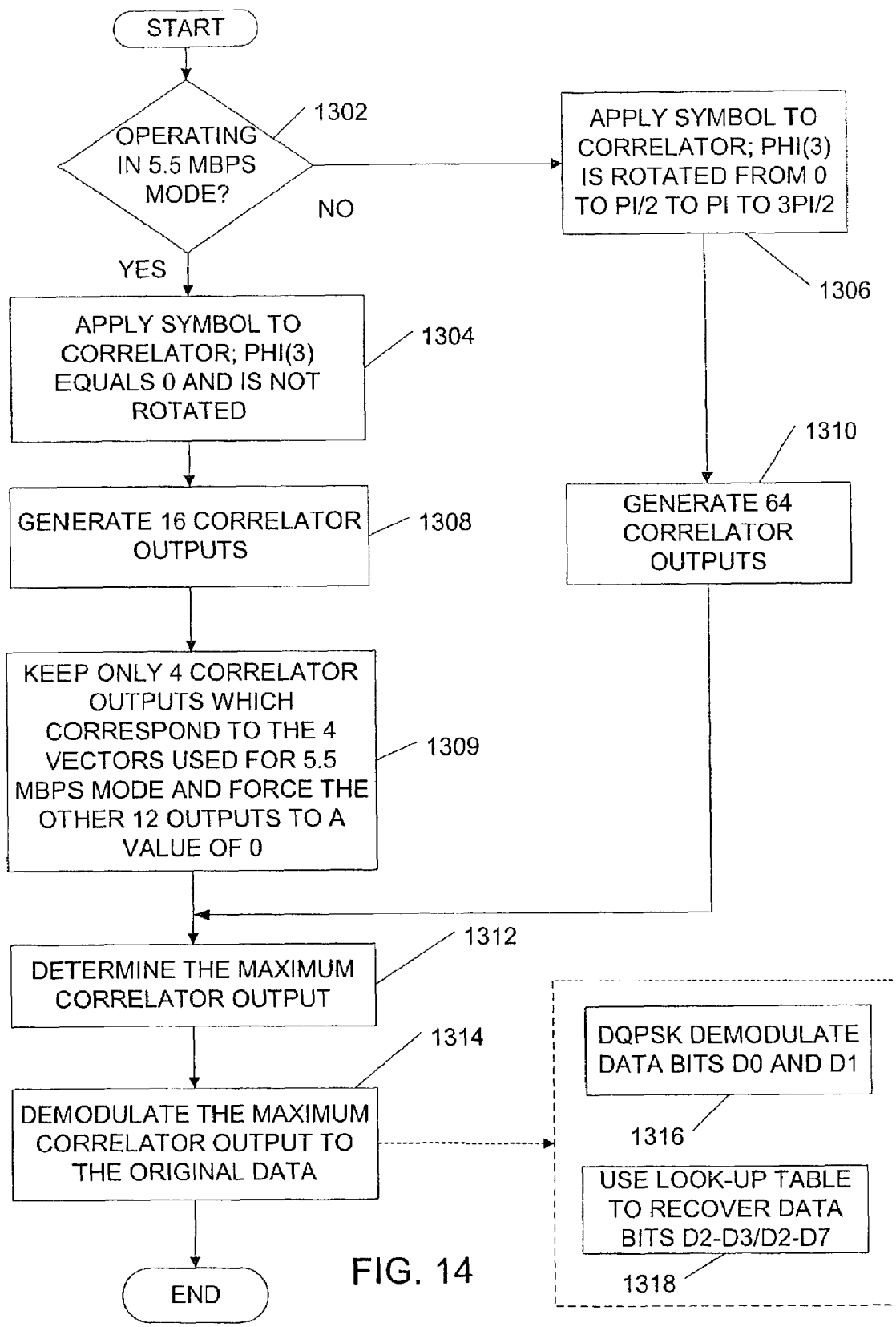
FIG. 14 shows a flow diagram depicting one exemplary approach to decoding data bits according to the principles of the present invention.

FIG. 14 is a flow diagram depicting data demodulation according to one exemplary embodiment of the present invention. In block 1302, it is determined if the data demodulator 608 (FIGS. 6–7) is operating in 5.5 Mbps or 11 Mbps mode. This is done by examining the header 404 (FIG. 4) which contains an indication of the operating mode in the operating mode indicator 405. If the data demodulator 608 is operating in 5.5 Mbps mode, then at block 1304 the received symbol is applied to the correlator 702 (FIG. 7). The $\phi_3$ rotator is set to output a value of 0, as $\phi_3$ is not rotated in 5.5 Mbps mode according to one exemplary embodiment of the present invention. The correlator 702 then generates 16 outputs (block 1308). The correlator 702 keeps only four of the outputs which correspond to the four vectors used for the 5.5 Mbps mode. The other twelve output values are forced to a value of 0 (block 1309). If, on the other hand, the data demodulator 608 is operating in 11 Mbps mode, then at block 1306 the received symbol is applied to the correlator 702 (FIG. 7). The $\phi_3$ rotator, however, is now set to rotate through its four values (0, B/2, B and 3B/2), so that the correlator 702 will generate 64 outputs (block 1310). Regardless of whether 16 or 64 outputs are generated (i.e., in either operating mode), at block 1312 the maximum correlator output is determined. The maximum correlator output is then demodulated to output the original data (block 1314). As shown, the demodulation of the block 1314 is performed by DQPSK demodulating the data to determine data bits d0 and d1 (block 1316) and using a look-up table to recover data bits d2–d3 (5.5 Mbps) or d2–d7 (11 Mbps) (block 1318).

Figure 15:
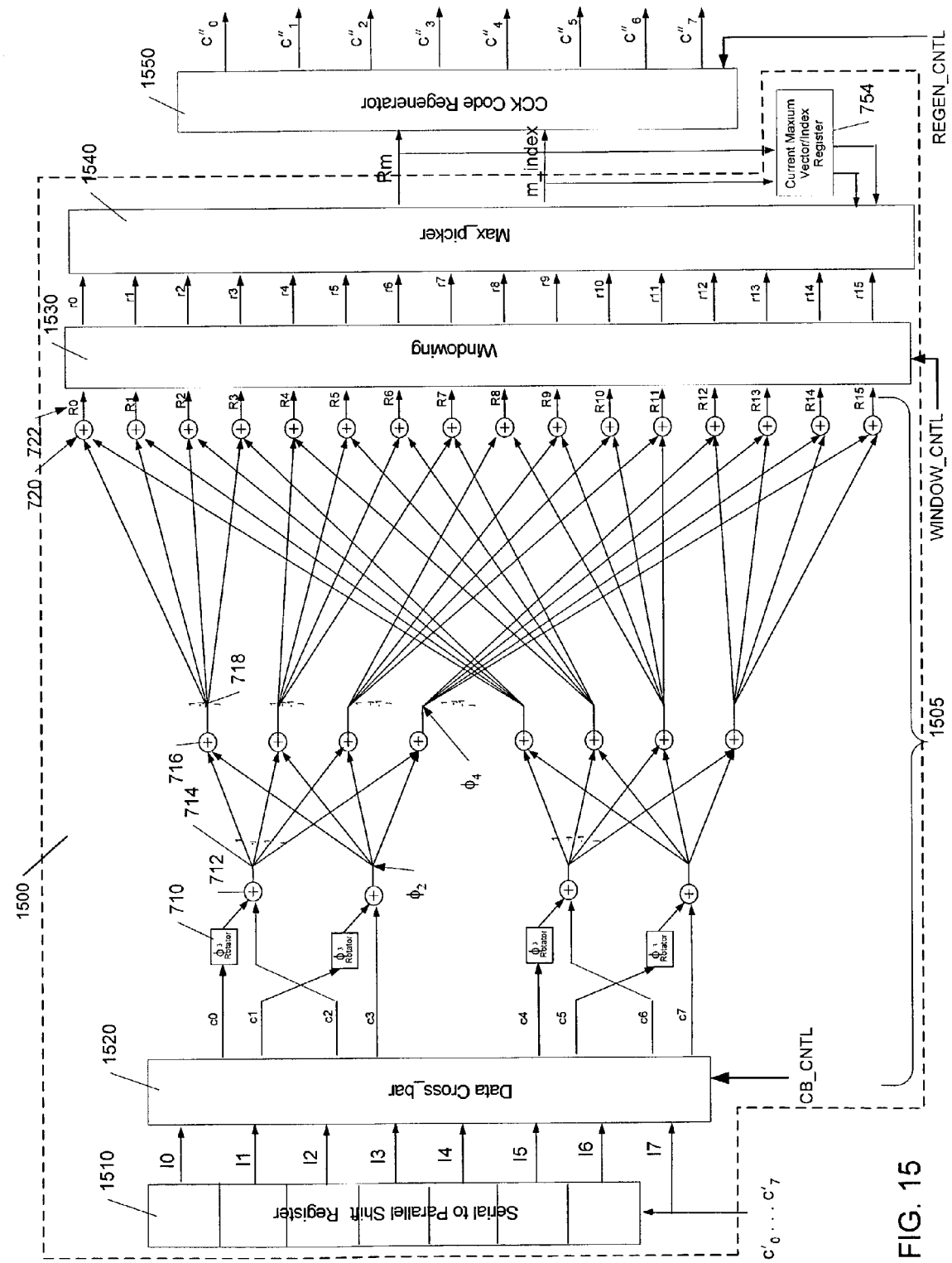
FIG. 15 shows a 64-vector correlation unit for use in accordance with another embodiment of the invention.

FIG. 15 illustrates a 64-vector unit 1500 correlation unit consistent with another embodiment of the invention, which can be configured to selectively predict CCK subsymbols responsive to a received subset of chips c0' . . . c7' defining a received CCK encoded symbol C'. These predicted CCK subsymbols can be regenerated for e.g. equalization purposes via the CCK code regenerator 1550 coupled to the output of the correlation unit 1500. The prime notation here is used to signify potential differences between the received symbol/chips (c'={c0' . . . c7'}) and the originally transmitted symbol/chips (c={c0 . . . c7}) resulting from intervening ISI, inter chip interference ("ICI") and environmental noise. As noted above, subsymbol prediction and regeneration can be used in adaptive channel equalization of the received baseband signal to address such noise and interference in order for C' to approach the transmitted C. In accordance with the decoding techniques disclosed in U.S. patent application Ser. No. 10/080,826, filed Feb. 21, 2002, the contents of which are incorporated herein fully by reference, predicted subsymbols regenerated during certain chips in the current C' symbol decode sequence can be used to equalize the received chips of C' when subsequent chips of C' are received, thereby leveraging the processing gain of the CCK decoder to provide more accurate and sensitive feedback and baseband symbol demodulation over conventional systems which e.g. employ no feedback or solely hard-decision slicing for equalization purposes. For example, regeneration of a predicted $2^{nd}$ chip subsymbol $C_2''$, defining $\{c0'',c1''\}$ after c1' is received (i.e. after the $2^{nd}$ chip into the current symbol C' decode sequence) may be used to equalize received chips c0', c1' Likewise, other subsymbols may be predicted and regenerated to equalize the received chips at other times into the current symbol decode sequence.

Comparing the correlator 1500 of FIG. 15 to the correlator 702 shown in FIG. 9, the following differences are noted. First, a serial to parallel shift register 1510 is expressly shown and provides the serialized sequence of chips defining the symbol or subsymbol to be demodulated in parallel to the input of the correlator 1500. However, though not shown in FIG. 9, such functionality may be provided as part of the correlator 702 based on receiver implementation requirements. Second, a data cross bar 1520 is connected to the output of the serial to parallel shift register 1510 to selectively map the received chips into the inputs of the correlation unit 1505 dependent upon the type of predicted subsymbol is to be regenerated or if the entire symbol is to be decided. These and other functions of the data cross bar 1520 will be discussed in more detail further below.

Also, the correlator 1500 includes a windowing unit 1530 which selectively filters certain invalid vectors from correlation result vectors R0 . . . R15 (once for 5.5 Mb mode and 4 times for 11 Mbps mode corresponding to the need for rotating through $\phi_3$ as described above), also responsive to which type of predicted subsymbol is to be regenerated or if the entire symbol is to be decided. Alternatively phrased, the windowing unit selects a valid subset of candidate correlation result vectors R0 . . . R15 based on which type of subsymbol or symbol is to be realized. In this embodiment, invalid correlation results are zeroed out to the origin on the complex plane (0,0) such that their magnitude or absolute value is zero.

The reason why not all 16 or 64 correlation result vectors are needed here is because consistent with most-likely subsymbol prediction according to the present embodiment, not all chips required to completely define a given symbol are needed to predict a subsymbol. In fact, as will be discussed in greater detail below, to predict and regenerate a $2^{nd}$ chip subsymbol $C_2''$ of a given CCK-encoded symbol C, only chips c0' and c1' need be received. Likewise, only chips c0' . . . c3' are required to predict and regenerate a $4^{th}$ chip CCK subsymbol $C_4''$, chips c0' . . . c5' are required to for a $6^{th}$ chip CCK subsymbol $C_6''$.

However, as before, all eight chips c0' . . . c7' will be needed to fully decide the CCK symbol and regenerate it during the $8^{th}$ chip ($C_8''$).

The maximum magnitude picker unit 1540 combines the functionality previously associated with the absolute value units 750 and the comparator 752 described above with reference to the embodiment of FIG. 10, and in conjunction with a current maximum vector/index register 1545, identifies the correlation result vector Rm from the input set of valid correlation result vectors r0 . . . r15 as well as its corresponding correlator index, m_index, which has the maximum correlator output value once per clock cycle in 5.5 Mbps mode, or after $\phi_3$ rotation (four cycles) is complete when in 11 Mbps mode. The register 1545 differs from the current maximum value module 754 in that current maximum correlator index information is also stored.

2nd Chip Subsymbol Prediction

In this case, only 2 chips (c0', c1') of the current symbol are available, and the shift register 1510 holds c0', and c1' is received from the output of the RF demodulator 606 (FIG. 6) and asserted on tap I7. At this time, the most likely 2nd chip subsymbol may be defined as:

$$C_2''=\{c0'',c1''\}=\{e^{j(\alpha_1+\alpha_2+\alpha_3+\alpha_4)}, e^{j(\alpha_1+\alpha_3+\alpha_4)}\}=\{e^{j\alpha_2}, 1\}*e^{j(\alpha_1+\alpha_3+\alpha_4)} \quad (7)$$

And the optimized correlation should be:

$$R_2 = \begin{bmatrix} 16 \\ 17 \end{bmatrix}^T \begin{bmatrix} e^{j\alpha_2} \\ 1 \end{bmatrix}^* \quad (8)$$

To obtain $R_2$ with different possible $\alpha_2$ using the correlator 1505 shown in FIG. 15, for either the 5.5 or 11 Mbps mode, the data cross bar 1520 is configured to reposition the received chips to the inputs of the correlator 1505 as follows {c0, c1, c2, c3, c4, c5, c6, c7}={0,0,I6,I7,0,0,0,0} or, alternatively {0,0,c1',c0',0,0,0,0). Thus, with this configuration of the data cross bar 1520, the correlator 1505 output may be written as:

$$R = \begin{bmatrix} 0 \\ I6 \\ 0 \\ I7 \\ 0 \\ 0 \\ 0 \\ 0 \end{bmatrix}^T \begin{bmatrix} e^{j\varphi_3} & & & \\ 1 & & & \\ & e^{j\varphi_3} & & \\ & 1 & & \\ & & e^{j\varphi_3} & \\ & & 1 & \\ & & & e^{j\varphi_3} \\ & & & 1 \end{bmatrix} \begin{bmatrix} e^{j\varphi_2} & \\ 1 & \\ & e^{j\varphi_2} \\ & 1 \end{bmatrix}^* \begin{bmatrix} e^{j\varphi_4} \\ 1 \end{bmatrix}^* \quad (9)$$

If $\phi_2=\alpha_2$, $\phi_4=0$, then $R_2=R$. Considering that $\phi_2\in\{0,\pi/2, \pi,3\pi/2\}$ in 11 Mbps mode, four (4) valid correlation result vectors R may be calculated by the correlator 1505 dependent on the differing $\phi_2$, indicating the $2^{nd}$ chip subsymbol can be predicted from one of 4 different combinations of c0',c1'. For the 11 Mbps mode, the windowing unit 1530 window is selected as (1,1,1,1,1,1,1,1,1,1,1,1,1,1,1,1) for R0 to R15 from left to right, thereby passing all correlation result vectors R to the maximum magnitude picker unit 1540 for maximum correlation magnitude result determination of corresponding r0 ... r15. For 5.5M, because $\alpha_2$ has only two possible values (+j, −j), according to the power saving architecture of the correlator 1505, the windowing unit 1530 window is selected as (0,0,0,0,1,0,0,0,0,0,0,0,1,0,0,0). It should be noted that the remaining correlation result R0–R3, R5–R11 and R13–R15 are not valid for this transmission mode and chip into the current symbol decode sequence, and are properly ignored for magnitude comparison by the maximum magnitude picker unit 1540 using this withdrawing unit 1530 configuration.

The maximum magnitude picker unit 1540 realizes the magnitude for each valid vector r and determines which exhibits the maximum magnitude (Rm) as well as correlator index m_index having the maximum correlator output value, in a manner consistent with that described above with reference to the embodiment of FIG. 10. The phase value for $\phi_2$ (recoverable from the m_index into a CCK symbol lookup table) corresponding to the maximum magnitude (say, $\Gamma_2$) is assigned to $\alpha_2(\alpha_2=\Gamma_2)=+j$ or −j for 5.5 Mbps mode. From Equations (7) (8) (9), $\alpha_1+\alpha_3+\alpha_4=\arg R_2$ which corresponds to the phase of the residue of the correlator 1505 when the 2$^{nd}$ chip subsymbol is predicted. Therefore, from Equations (7) (8) and this residue relationship, the CCK code regenerator 1550 may regenerate the most-likely 2$^{nd}$ chip subsymbol $C_2''$ as:

$$C_2''=\{c0'',c1''\}=\{e^{j(\Gamma_2+\arg R_2)}, e^{j\arg R_2}\}. \quad (10)$$

4$^{th}$ Chip Subsymbol Prediction

In this case, the first four complex chips (c0', c1', c2', c3') of the current symbol are available, with the shift register 1510 holding (c0', c1', c2') accessible through taps I4, I5 and I6 respectively and c3' is received from the output of the RF demodulator 606 and asserted on tap I7. At this time, the most likely 4$^{th}$ chip subsymbol may be defined as:

$$C_4''=\{e^{j(\alpha_1+\alpha_2+\alpha_3+\alpha_4)}, e^{j(\alpha_1+\alpha_3+\alpha_4)}, e^{j(\alpha_1+\alpha_2+\alpha_4)}, -e^{j(\alpha_1+\alpha_4)}\} = \{e^{j(\alpha_2+\alpha_3)}, e^{j\alpha_3}, e^{j\alpha_2}, -1\} * e^{j(\alpha_1+\alpha_4)} \quad (11)$$

And the optimized correlation should be:

$$R_4 = \begin{bmatrix} I4 \\ I5 \\ I6 \\ I7 \end{bmatrix}^T \begin{bmatrix} e^{j(\alpha_2+\alpha_3)} \\ e^{j\alpha_3} \\ e^{j\alpha_2} \\ -1 \end{bmatrix}^* \quad (12)$$

To obtain $R_4$ with different possible combinations of $\alpha_2$ and $\alpha_3$ using the correlator 1505, the data cross bar 1520 is configured to reposition the received chips as follows: (c0, c1, c2, c3, c4, c5, c6, c7)=(0,0,I4,I5,0,0,I6,−I7) or, alternatively put, =(0,0,c0',c1',0,0,c2',−c3'). Thus, the correlator 1505 output may be written as:

$$R = \begin{bmatrix} 0 \\ I4 \\ 0 \\ I5 \\ 0 \\ I6 \\ 0 \\ -I7 \end{bmatrix}^T \begin{bmatrix} e^{j\varphi_3} \\ 1 \\ & e^{j\varphi_3} \\ & 1 \\ & & e^{j\varphi_3} \\ & & 1 \\ & & & e^{j\varphi_3} \\ & & & 1 \end{bmatrix}^* \begin{bmatrix} e^{j\varphi_2} \\ 1 \\ & e^{j\varphi_2} \\ & 1 \end{bmatrix}^* \begin{bmatrix} e^{j\varphi_4} \\ 1 \end{bmatrix}^* \quad (13)$$

If $\phi_2=\alpha_2$, $\phi_3=\alpha_3$, then $R_4=R$. Considering that $\phi_2\in\{0,\pi/2,\pi,3\pi/2\}$ and $\phi_3\in\{0,\pi/2,\pi,3\pi/2\}$ in 11 Mbps mode, sixteen (16) valid correlation result vectors R are calculated by the correlator 1505, indicating that the 4$^{th}$ chip subsymbol can be predicted from one of 16 different combinations of c0', c1', c2' and c3'. For the 11 Mbps mode, the windowing unit 1530 window is selected as (1,1,1,1,1,1,1,1,1,1,1,1,1,1,1,1), thereby passing all correlation result vectors R to the maximum magnitude picker unit 1540 for maximum correlation magnitude result determination of corresponding r0 ... r15. For 5.5 Mbps mode, because $\alpha_2$ has only two possible values and $\alpha_3=0$, according to the power saving architecture of the correlator 1505, the windowing unit window is selected as (0,0,0,0,1,0,0,0,0,0,0,0,1,0,0,0), such that only vectors R4 and R12 are passed along as r4 and r12 respectively, with the remaining vectors equated to the origin of the complex plane to provide a magnitude of zero [[please confirm]].

As before, the maximum magnitude picker unit 1540 realizes the magnitude for each valid vector r generated by the windowing unit and determines which exhibits the maximum magnitude (Rm) as well as m_index, as previously described. The phase values for $\phi_2$ and $\phi_3$ (recoverable using the m_index) corresponding to the maximum magnitude (say, $\Gamma_2$, $\Gamma_3$) is assigned to $\alpha_2$ and $\alpha_3$, or:

$$\begin{cases} \alpha_2 = \Gamma_2 \\ \alpha_3 = \Gamma_3 \end{cases}.$$

In this case, the phase of the residue of the correlator can be derived from Equations (11), (12) and (13), and can be expressed as $\alpha_1+\alpha_4=\arg R_4$. Therefore, from Equations (11), (12) and this residue phase relationship, the CCK code regenerator 1550 may regenerate the most-likely 4$^{th}$ chip subsymbol $C_4$ as:

$$C_4''=\{c0'',c1'',c2'',c3''\}=\{e^{j(\arg R_4+\Gamma_2+\Gamma_3)}, e^{j(\arg R_4+\Gamma_3)}, e^{j(\arg R_4+\Gamma_2)}, -e^{j\arg R_4}\}. \quad (14)$$

6$^{th}$ Chip Subsymbol Prediction

In this case, the first six complex chips (c0', c1', c2', c3', c4', c5') of the current symbol are available, with the shift register 1510 holding (c0', c1', c2', c3', c4') accessible through taps I2, I3, I4, I5, and I6 respectively and c5' is received from the output of the RF demodulator 606 and asserted on tap I7. At this time, the most likely 6$^{th}$ chip subsymbol $C_6$ may be defined as:

$$C_6''=\{e^{j(\alpha_1+\alpha_2+\alpha_3+\alpha_4)},e^{j(\alpha_1+\alpha_3+\alpha_4)},e^{j(\alpha_1+\alpha_2+\alpha_4)},-e^{j(\alpha_1+\alpha_4)},e^{j(\alpha_1+\alpha_2+\alpha_3)},e^{j(\alpha_1+\alpha_3)}\}=\{e^{j(\alpha_2+\alpha_3+\alpha_4)},e^{j(\alpha_3+\alpha_4)},-e^{j\alpha_4},e^{j(\alpha_2+\alpha_3)},e^{j\alpha_3}\}*e^{j\alpha_1} \quad (15)$$

And the optimized correlation should be:

$$R_6 = \begin{bmatrix} I2 \\ I3 \\ I4 \\ I5 \\ I6 \\ I7 \end{bmatrix}^T \begin{bmatrix} e^{j(\alpha_2+\alpha_3+\alpha_4)} \\ e^{j(\alpha_3+\alpha_4)} \\ e^{j(\alpha_2+\alpha_4)} \\ -e^{j\alpha_4} \\ e^{j(\alpha_2+\alpha_3)} \\ e^{j\alpha_3} \end{bmatrix}^* \quad (16)$$

To obtain R6 with different possible combinations of $\alpha_2$, $\alpha_3$ and $\alpha_4$ using the correlator 1505, the data cross bar 1520 is configured to reposition the received chips as follows: (c0, c1, c2, c3, c4, c5, c6, c7)=(I2,I3,I4,I5,I6,I7,0,0) or, alternatively put, =(c0',c1',c2',c3',c4',c5',0,0). Thus, the correlator 1505 output may be written as:

$$R = \begin{bmatrix} I2 \\ I3 \\ I4 \\ -I5 \\ I6 \\ I7 \\ 0 \\ 0 \end{bmatrix}^T \begin{bmatrix} e^{j\varphi_3} & & & \\ 1 & & & \\ & e^{j\varphi_3} & & \\ & 1 & & \\ & & e^{j\varphi_3} & \\ & & 1 & \\ & & & e^{j\varphi_3} \\ & & & 1 \end{bmatrix} \begin{bmatrix} \begin{bmatrix} e^{j\varphi_2} \\ 1 \\ e^{j\varphi_2} \\ 1 \end{bmatrix} \begin{bmatrix} e^{j\varphi_4} \\ 1 \end{bmatrix}^* \end{bmatrix}^* \quad (17)$$

If $\phi_2=\alpha_2$, $\phi_3=\alpha_3$, $\phi_4=\alpha_4$, then $R_6=R$. Considering that $\phi_2\in\{0,\pi/2,\pi,3\pi/2\}$, $\phi_3\in\{0,\pi/2,\pi,3\pi/2\}$, and $\phi_4\in\{0,\pi/2,\pi,3\pi/2\}$ in 11 Mbps mode, all 64 possible correlating operations (4 cycles of 16 vector correlating through rotation of $\phi_3$) are carried out by the correlator 1505, now indicating that the $6^{th}$ chip subsymbol can be predicted from one of 64 different combinations of c0' . . . c5'. For the 11 Mbps mode, the windowing unit 1530 window is selected as (1,1,1,1,1,1,1,1,1,1,1,1,1,1,1,1) as in the case of predicted subsymbols $C_2''$ and $C_4''$ previously discussed, thereby passing all correlation result vectors R to the maximum magnitude picker unit 1540 for maximum correlation magnitude result determination of corresponding r0 . . . r15. For 5.5 Mbps mode, because the combination of $\alpha_2$ and $\alpha_4$ has only four possible values and $\alpha_3=0$, according to the power saving architecture of the correlator 1505, the windowing unit 1530 window is selected as (0,0,0,0,1,0,1,0,0,0,0,0,1,0,1,0), such that only vectors R4, R6, R12, and R14 as passed along as vectors r4, r6, r12, and r14 respectively, with the remaining vectors zeroed out.

As in the case for $C_2''$ and $C_4''$ subsymbol prediction, the maximum magnitude picker unit 1540 here realizes the magnitude for each valid vector r generated by the windowing unit and determines which exhibits the maximum magnitude (Rm) as well as m_index. The phase values for $\phi_2$, $\phi_3$ and $\phi_4$ (recoverable using the m_index) corresponding to the maximum magnitude (say, $\Gamma_2$, $\Gamma_3$, $\Gamma_4$) is assigned to $\alpha_2$, $\alpha_3$ and $\alpha_4$ or:

$$\begin{cases} \alpha_2 = \Gamma_2 \\ \alpha_3 = \Gamma_3 \\ \alpha_4 = \Gamma_4. \end{cases} \quad (18)$$

From Equations (15), (16), and (17), the phase of the residue of the correlator 1505 may be expressed as $\alpha_1$=arg $R_6$. Therefore, from Equations (15), (16) and this residue phase relationship, the CCK code regenerator 1550 may regenerate the most-likely $6^{th}$ chip subsymbol $C_6''$ as:

$$C_6''=\{c0'',c1'',c2'',c3'',c4'',c5''\}=\{e^{j(arg\ R_6+\Gamma_2+\Gamma_3+\Gamma_4)},e^{j(arg\ R_6+\Gamma_3+\Gamma_4)},e^{j(arg\ R_6+\Gamma_2+\Gamma_4)},-e^{j(arg\ R_6+\Gamma_4)},e^{j(arg\ R_6+\Gamma_2+\Gamma_3)},e^{j(arg\ R_6+\Gamma_3)}\} \quad (19)$$

$8^{th}$ Chip Symbol Decision

In this case, all eight received complex chips (c0' . . . c7') of the current symbol are available, with the shift register 1510 holding (c0' . . . c6') accessible through taps I0 . . . I6 respectively and c7' is received from the output of the RF demodulator 606 and asserted on tap I7. At this time, the most likely $8^{th}$ chip symbol $C_8$ may be defined as:

$$C_8''=\{e^{j(\alpha_1+\alpha_2+\alpha_3+\alpha_4)},e^{j(\alpha_1+\alpha_3+\alpha_4)},e^{j(\alpha_1+\alpha_2+\alpha_4)},-e^{j(\alpha_1+\alpha_4)},e^{j(\alpha_1+\alpha_2+\alpha_3)},e^{j(\alpha_1+\alpha_3)},-e^{j(\phi_1+\phi_2)},e^{j\phi_1}\}=\{e^{j(\alpha_2+\alpha_3+\alpha_4)},e^{j(\alpha_3+\alpha_4)},e^{j(\alpha_2+\alpha_4)},-e^{j\alpha_4},e^{j(\alpha_2+\alpha_3)},e^{j\alpha_3},-e^{j\phi_2},1\}*e^{j\alpha_1} \quad (20)$$

And the optimized correlation should be:

$$R_3 = \begin{bmatrix} I0 \\ I1 \\ I2 \\ I3 \\ I4 \\ I5 \\ I6 \\ I7 \end{bmatrix}^T \begin{bmatrix} e^{j(\alpha_2+\alpha_3+\alpha_4)} \\ e^{j(\alpha_3+\alpha_4)} \\ e^{j(\alpha_2+\alpha_4)} \\ -e^{j\alpha_4} \\ e^{j(\alpha_2+\alpha_3)} \\ e^{j\alpha_3} \\ -e^{j\alpha_2} \\ 1 \end{bmatrix}^* \quad (21)$$

Using the correlator 1505 to obtain $R_8$, the data cross bar 1520 simply passes along the cTo get R6 with different $\alpha_2$, $\alpha_3$, $\alpha_4$, we may configure the data cross bar unit 1520 just as a pass through buffer, e.g. (c0, c1, c2, −c3, c4, c5, c6, −c7)=(I0, I1, I2, I3, I4, I5, I6, I7), or, alternatively put, =(c0', c1', c2', −c3', c4', c5', c6', −c7'). Then, the general correlator 1505 output is:

$$R_3 = \begin{bmatrix} I0 \\ I1 \\ I2 \\ I3 \\ I4 \\ I5 \\ I6 \\ I7 \end{bmatrix}^T \begin{bmatrix} e^{j\varphi_3} & & & \\ 1 & & & \\ & e^{j\varphi_3} & & \\ & 1 & & \\ & & e^{j\varphi_3} & \\ & & 1 & \\ & & & e^{j\varphi_3} \\ & & & 1 \end{bmatrix} \begin{bmatrix} \begin{bmatrix} e^{j\varphi_2} \\ 1 \\ e^{j\varphi_2} \\ 1 \end{bmatrix} \begin{bmatrix} e^{j\varphi_4} \\ 1 \end{bmatrix}^* \end{bmatrix}^* \quad (22)$$

If $\phi_2=\alpha_2$, $\phi_3=\alpha_3$, $\phi_4=\alpha_4$, then $R_8=R$. Similar to $6^{th}$ chip subsymbol prediction discussed above, and considering that $\phi_2 \epsilon (0, \pi/2, \pi, 3\pi/2)$, $\phi_3 \epsilon \{0, \pi/2, \pi, 3\pi/2\}$, and $\phi_4 \epsilon \{0, \pi/2, \pi, 3\pi/2\}$ in 11 Mbps mode, all 64 possible correlating operations (4 cycles of 16 vector correlating through rotation of $\phi_3$) are carried out by the correlator 1505, now indicating that the $8^{th}$ chip symbol can be decided from one of 64 different combinations of c0' . . . c7'. For the 11 Mbps mode, the windowing unit 1530 window is again selected as (1,1,1,1, 1,1,1,1,1,1,1,1,1,1,1,1), thereby passing all correlation result vectors R to the maximum magnitude picker unit 1540 for maximum correlation magnitude result determination of corresponding r0 . . . r15. For 5.5 Mbps mode, because the combination of $\alpha_2$ and $\alpha_4$ has only four possible values and $\alpha_3$=0, according to the power saving architecture of the correlator 1505, the windowing unit 1530 window is selected as (0,0,0,0,1,0,1,0,0,0,0,0,1,0,1,0), such that only vectors R4, R6, R12, and R14 as passed along as vectors r4, r6, r12, and r14 respectively, with the remaining vectors zeroed out.

As in the case for subsymbol prediction discussed, the maximum magnitude picker unit 1540 here realizes the magnitude for each valid vector r generated by the windowing unit and determines which exhibits the maximum magnitude (Rm) as well as m_index. The phase values for $\phi 2$, $\phi 3$ and $\phi 4$ (recoverable using the m_index) corresponding to the maximum magnitude (say, $\Gamma_2$, $\Gamma_3$, $\Gamma_4$) is assigned to $\alpha_2$, $\alpha_3$ and $\alpha_4$ or:

$$\begin{cases} \alpha_2 = \Gamma_2 \\ \alpha_3 = \Gamma_3 \\ \alpha_4 = \Gamma_4. \end{cases} \quad (23)$$

From Equations (20), (21), and (22), the phase of the residue of the correlator 1505 may be expressed as $\alpha_1 = \arg R_8$. Therefore, from Equations (20), (21) and this residue phase relationship, the CCK code regenerator 1550 may regenerate the $8^{th}$ chip decided symbol $C_8"$ as:

$$C_8" = (c0", c1", c2", c3", c4", c5", c6", c7") = \{ e^{j(\arg R^{8+\Gamma_2+\Gamma_3+\Gamma_4})}, e^{j(\arg R_8+\Gamma_3+\Gamma_4)}, e^{j(\arg R_8+\Gamma_2+\Gamma_4)}, -e^{j(\arg R^{8+\Gamma_4})}, e^{j(\arg R_8+\Gamma_2+\Gamma_3)}, e^{j(\arg R_8+\Gamma_3)}, -e^{j(\arg R^{8+\Gamma_2})}, e^{j \arg R_8} \} \quad (24)$$

Figure 16:
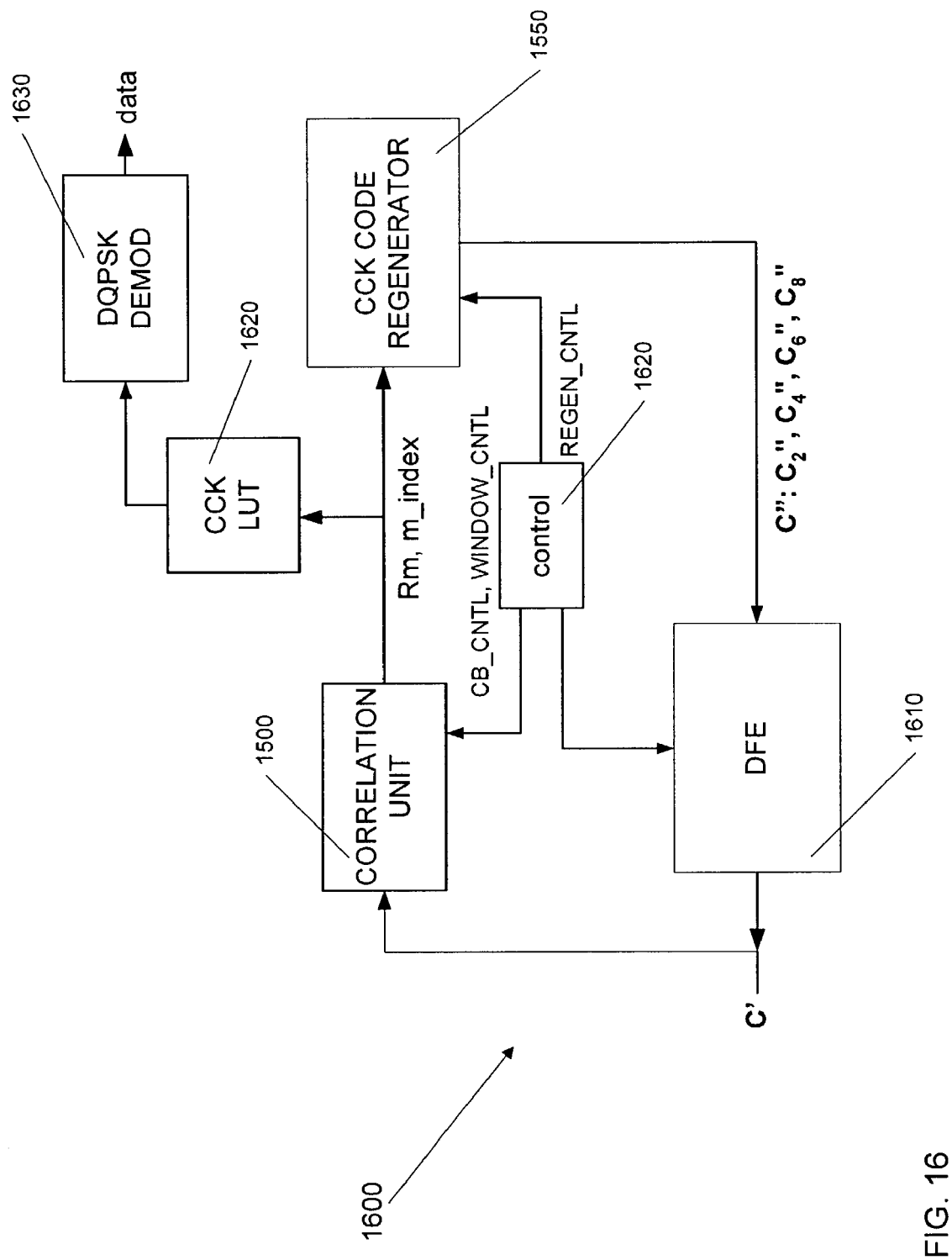
FIG. 16 depicts a symbol demodulation system including the including the correlation unit shown in FIG. 15.

FIG. 16 depicts a CCK symbol demodulation unit 1600 which may be used in the data demodulation unit 608 in an alternative embodiment of the invention. This demodulation unit 1600 provides for decision feedback equalization of the received CCK symbols (C') through a digital feedback equalizer (DFE) 1610 coupled to the CCK code regenerator 1550 and correlation unit 1500 shown in FIG. 15. In particular, predicted subsymbols C2", C4", C6"and/or C8" are computed by the correlation unit 1500 and regenerated by the regenerator 1550 as noted above and are used by the DFE 1610 during the second, fourth, six and/or eighth chip into the current symbol decode sequence respectively to leverage the processing gain afforded by the correlation unit 1500 and equalize the corresponding chips of the current symbol C' fed to the correlation unit 1500, as discussed above with reference to U.S. patent application Ser. No. 10/080,826. Note here that a control unit 1620 issues data cross bar 1520 configuration parameters such as a CB_CN-TRL parameter to configure the data cross bar to selectively reposition the received chips of C' based on which subsymbol is to be predicted. The control unit 1620 likewise passes appropriate configuration parameters to the CCK code regenerator 1550 (e.g. REGEN_CNTL) and the windowing unit 1530 (e.g. WINDOW_CNTL) again based on which subsymbol type(s) are desired for prediction and what transmission rate mode the demodulation unit 1600 is operating in. As will be appreciated by those ordinarily skilled in the art, the WINDOW_CNTL, CB_CNTL and REGEN_CNTL may define individual or common parameters depending upon implementation requirements.

Figure 17:
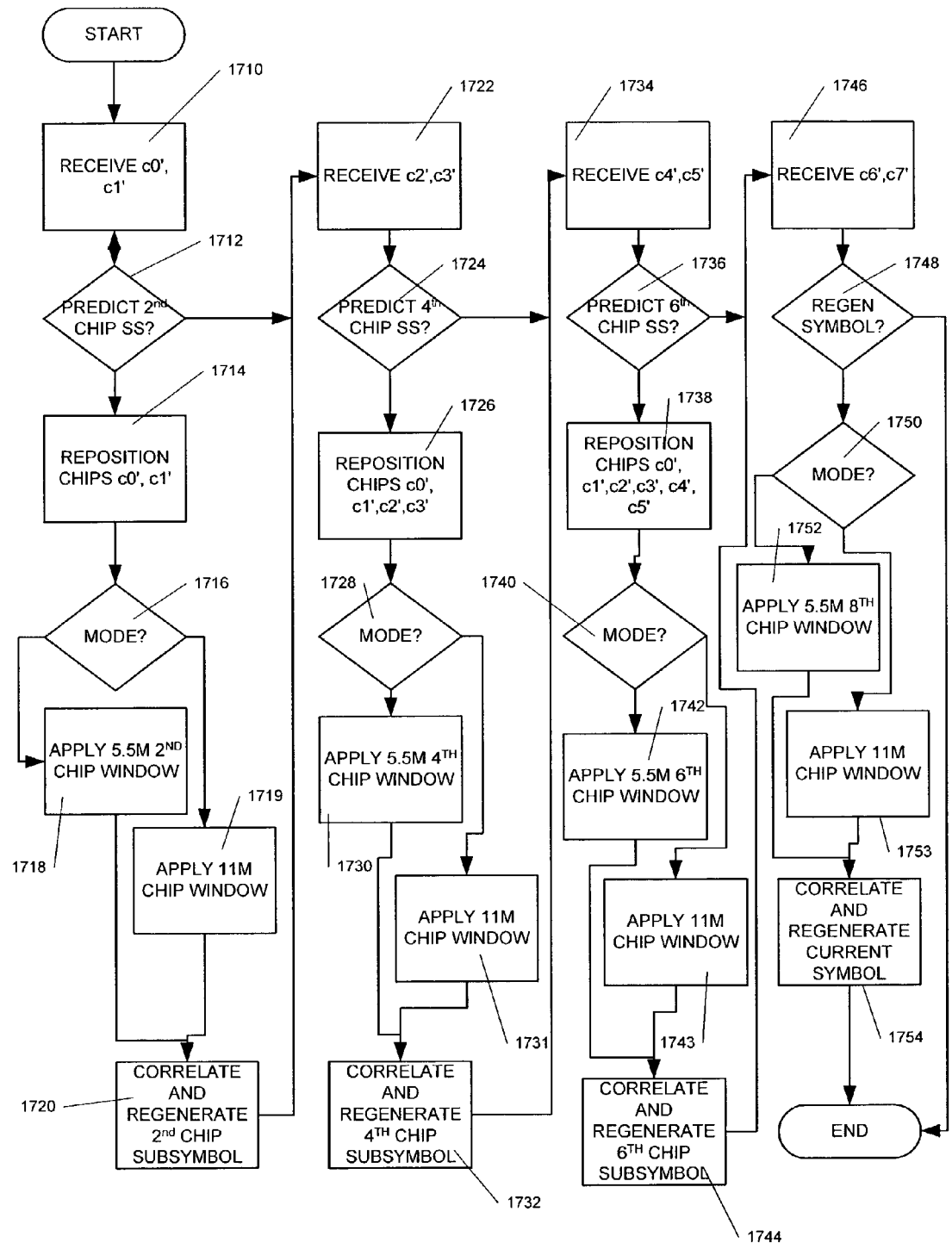
FIG. 17 illustrates a flowchart depicting subsymbol prediction and regeneration consistent with the embodiments shown in FIGS. 15 and 16.
Figure 9:
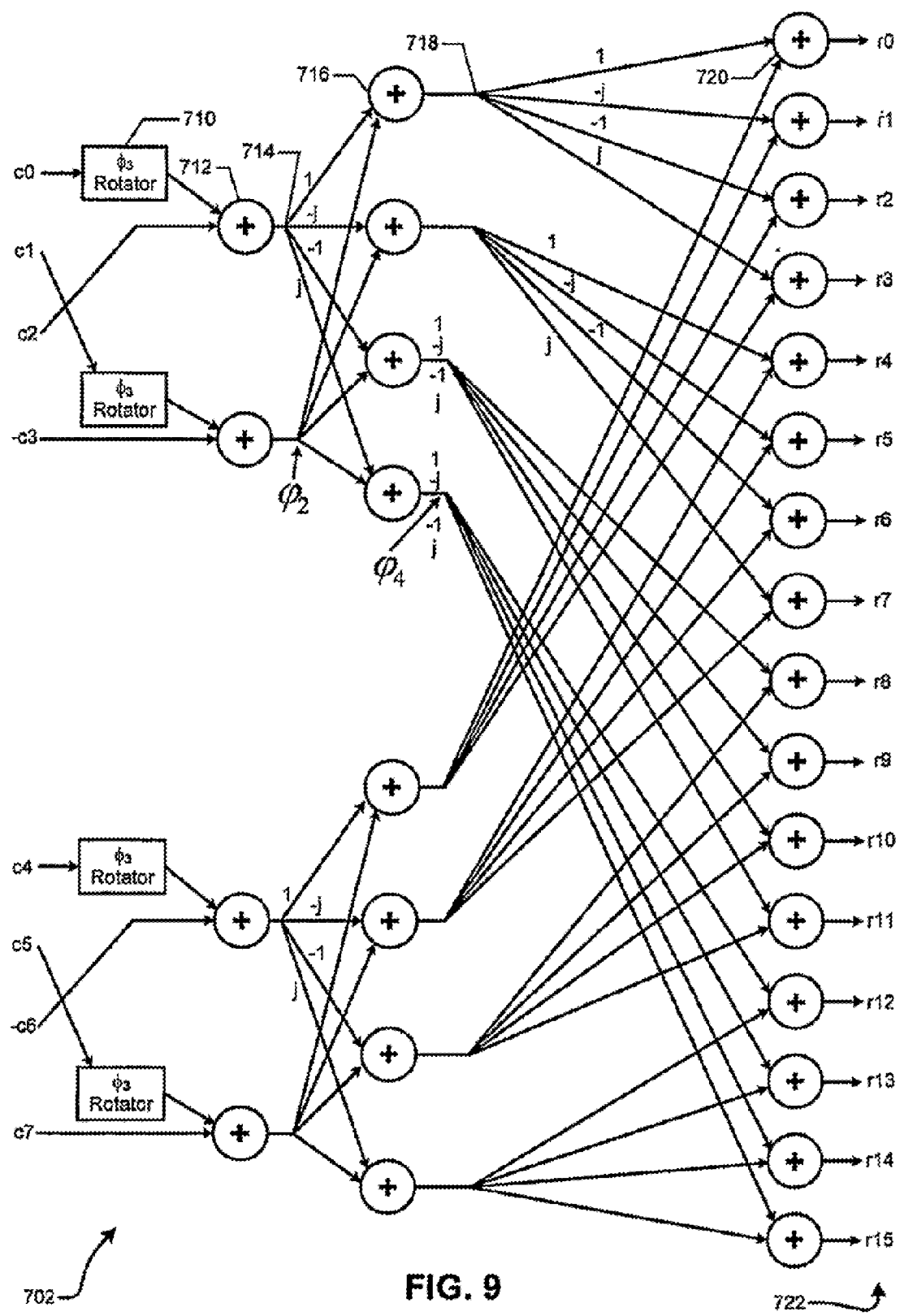
Figure 15:
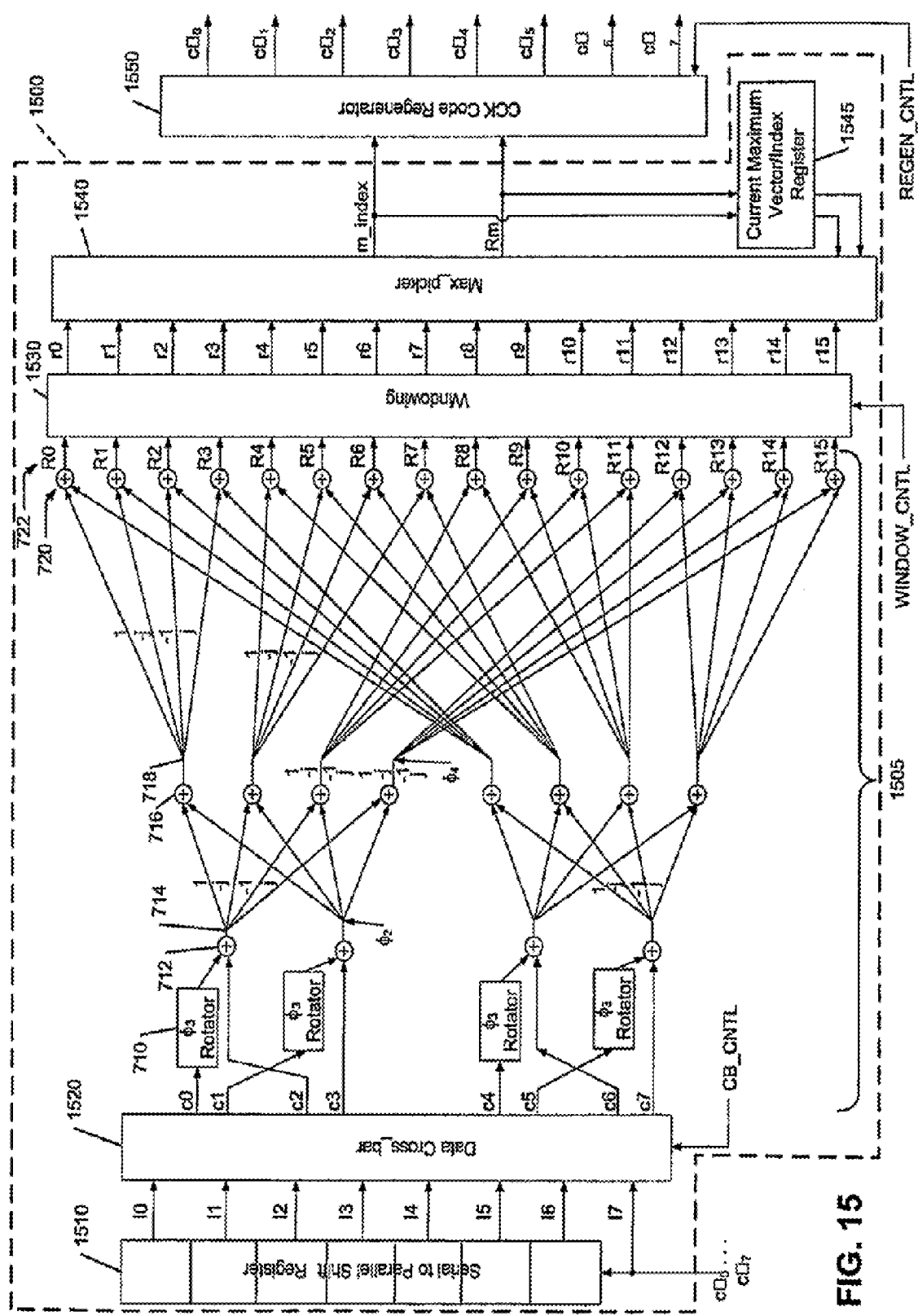

FIG. 17 is a flowchart depicting subsymbol prediction and correlation processing undertaken by the aforementioned correlation unit 1500.

It should also be appreciated by those ordinarily skilled in the art that the present invention may be practiced at least in part through the use of an information processing system including a general purpose or specific-purpose processor, embodied by software or firmware. For example, the correlation unit 1500 may conveniently comprise a microprocessor programmed in accordance with the processing steps outlined in FIG. 17 to provide the specified functionality. Likewise, discrete logic, in isolation or in combination with one or more application-specific circuits configured in accordance with the teachings of the present invention may be also used interchangeably depending upon implementation.

While the present invention has been described with respect to several embodiments, it is to be understood that the invention is not limited to the embodiments disclosed. To the contrary, the invention is intended to cover various modifications and equivalent arrangements included within the spirit and scope of the appended claims. For example, it is to be understood that the invention is generally applicable to other correlator architectures in which phase rotators may selectively be used, and in fact in any correlator architecture where it would be advantageous to predict subsymbols. The scope of the following claims is to be accorded the broadest interpretation so as to encompass all such modifications and equivalent structures and functions.

The invention claimed is:

1. A subsymbol prediction apparatus, comprising:
   a correlator having an input to accept a first set of modulated symbol chips in a first order, said correlator to generate a set of correlator output signals based on said first set of modulated symbol chips;
   a data cross bar to selectively feed a second set of modulated symbol chips in a second order to said correlator based on one of a plurality of predicted subsymbol types;
   a windowing unit to selectively generate a subset of the set of correlator output signals based on the one of a plurality predicted subsymbol types; and
   a maximum picker unit to identify a maximum-valued correlator output signal from one of the set of correlator output signals or the subset of the set of correlator output signals, the maximum-valued correlator output signal corresponding to a predicted subsymbol of the predicted subsymbol type.

2. The subsymbol prediction apparatus of claim 1, further comprising a subsymbol generation unit to generate a third set of modulated symbol chips responsive to the predicted subsymbol.

3. The subsymbol prediction apparatus of claim 2, wherein
   the first set of modulated symbol chips defines a first quantity of modulated symbol chips;
   wherein the second set of modulated symbol chips defines a second quantity of modulated symbol chips, the second quantity being less than the first quantity; and wherein the third set of modulated symbol chips defines a third quantity of modulated symbol chips, the third quantity being equal to the second quantity.

4. The subsymbol prediction apparatus of claim 3, wherein the first, second, and third sets of modulated symbol chips comprise respective sets of CCK-encoded chips.

5. The subsymbol prediction apparatus of claim 4, wherein the respective sets of CCK-encoded chips are encoded in accordance with IEEE 802.11b.

6. The subsymbol prediction apparatus of claim 5, wherein the plurality of subsymbol types includes a $2^{nd}$ chip subsymbol type, a $4^{th}$ chip subsymbol type, and a $6^{th}$ chip subsymbol type.

7. The subsymbol prediction apparatus of claim 1, wherein
the first set of modulated symbol chips defines a first quantity of modulated symbol chips; and
wherein the second set of modulated symbol chips defines a second quantity of modulated symbol chips, the second quantity being less than the first quantity.

8. The subsymbol prediction apparatus of claim 7, wherein the first quantity is eight and the second quantity is selected from the group consisting of two, four and six.

9. The subsymbol prediction apparatus of claim 1, wherein said data cross bar selectively feeds the second set of modulated symbol chips to said correlator based on the predicted subsymbol type and one of a plurality of data rates.

10. The subsymbol prediction apparatus of claim 9, wherein said windowing unit selectively generates a subset of the set of correlator output signals based on the predicted subsymbol type and the data rate.

11. The subsymbol prediction apparatus of claim 1, wherein said correlation unit comprises a power-saving correlation unit configured to generate one of a first set of correlator output signals and a second set of output signals based on a data rate associated with the second set of modulated symbol chips.

12. A receiver, comprising:
an RF demodulator to downconvert an inbound RF signal to recover a baseband signal defining a modulated symbol; and
a subsymbol prediction apparatus, comprising:
a correlator having an input to accept a first set of modulated symbol chips in a first order, said correlator to generate a set of correlator output signals based on said first set of modulated symbol chips;
a data cross bar to selectively feed a second set of modulated symbol chips within the baseband signal in a second order to said correlator based on one of a plurality of predicted subsymbol types;
a windowing unit to selectively generate a subset of the set of correlator output signals based on the one of a plurality predicted subsymbol types; and
a maximum picker unit to identify a maximum-valued correlator output signal from one of the set of correlator output signals or the subset of the set of correlator output signals, the maximum-valued correlator output signal corresponding to a predicted subsymbol of the predicted subsymbol type.

13. The receiver of claim 12, wherein the subsymbol prediction apparatus further comprises a subsymbol generation unit to generate a third set of modulated symbol chips responsive to the predicted subsymbol.

14. The receiver of claim 13, wherein
the first set of modulated symbol chips defines a first quantity of modulated symbol chips;
wherein the second set of modulated symbol chips defines a second quantity of modulated symbol chips, the second quantity being less than the first quantity; and
wherein the third set of modulated symbol chips defines a third quantity of modulated symbol chips, the third quantity being equal to the second quantity.

15. The receiver of claim 14, wherein the first, second, and third sets of modulated symbol chips comprise respective sets of CCK-encoded chips.

16. The receiver of claim 15, wherein the respective sets of CCK-encoded chips are encoded in accordance with IEEE 802.11b.

17. The receiver of claim 16, wherein the plurality of subsymbol types includes a $2^{nd}$ chip subsymbol type, a $4^{th}$ chip subsymbol type, and a $6^{th}$ chip subsymbol type.

18. The receiver of claim 12, wherein
the first set of modulated symbol chips defines a first quantity of modulated symbol chips; and
wherein the second set of modulated symbol chips defines a second quantity of modulated symbol chips, the second quantity being less than the first quantity.

19. The receiver of claim 18, wherein the first quantity is eight and the second quantity is selected from the group consisting of two, four and six.

20. The receiver of claim 12, wherein said data cross bar selectively feeds the second set of modulated symbol chips to said correlator based on the predicted subsymbol type and one of a plurality of data rates.

21. The receiver of claim 20, wherein said windowing unit selectively generates a subset of the set of correlator output signals based on the predicted subsymbol type and the data rate.

22. The receiver of claim 12, wherein said correlation unit comprises a power-saving correlation unit configured to generate one of a first set of correlator output signals and a second set of output signals based on a data rate associated with the second set of modulated symbol chips.

23. The receiver of claim 12, further comprising:
a subsymbol generation unit to generate a third set of modulated symbol chips responsive to the predicted subsymbol; and
a decision feedback equalizer to equalize the second set of modulated symbol chips against the third set of modulated symbol chips.

24. A transceiver, comprising:
a transmitter to broadcast an outbound signal bearing symbol modulated data; and
a receiver, comprising:
an RF demodulator to downconvert an inbound RF signal to recover a baseband signal defining a modulated symbol; and
a subsymbol prediction apparatus, comprising:
a correlator having an input to accept a first set of modulated symbol chips in a first order, said correlator to generate a set of correlator output signals based on said first set of modulated symbol chips;
a data cross bar to selectively feed a second set of modulated symbol chips within the baseband signal in a second order to said correlator based on one of a plurality of predicted subsymbol types;
a windowing unit to selectively generate a subset of the set of correlator output signals based on the one of a plurality predicted subsymbol types; and
a maximum picker unit to identify a maximum-valued correlator output signal from one of the set of correlator output signals or the subset of the set of correlator output signals, the maximum-valued correlator output signal corresponding to a predicted subsymbol of the predicted subsymbol type.

25. A subsymbol prediction apparatus, comprising:
means for accepting a first set of modulated symbol chips in a first order, said accepting means including means for generating a set of correlator output signals based on said first set of modulated symbol chips;
means for selectively feeding a second set of modulated symbol chips in a second order to said accepting means based on one of a plurality of predicted subsymbol types;
means for selectively generating a subset of the set of correlator output signals based on the one of a plurality predicted subsymbol types; and
means for identifying a maximum-valued correlator output signal from one of the set of correlator output signals or the subset of the set of correlator output signals, the maximum-valued correlator output signal corresponding to a predicted subsymbol of the predicted subsymbol type.

26. The subsymbol prediction apparatus of claim 25, further comprising means for generating a third set of modulated symbol chips responsive to the predicted subsymbol.

27. The subsymbol prediction apparatus of claim 26, wherein
the first set of modulated symbol chips defines a first quantity of modulated symbol chips;
wherein the second set of modulated symbol chips defines a second quantity of modulated symbol chips, the second quantity being less than the first quantity; and
wherein the third set of modulated symbol chips defines a third quantity of modulated symbol chips, the third quantity being equal to the second quantity.

28. The subsymbol prediction apparatus of claim 27, wherein the first, second, and third sets of modulated symbol chips comprise respective sets of CCK-encoded chips.

29. The subsymbol prediction apparatus of claim 28, wherein the respective sets of CCK-encoded chips are encoded in accordance with IEEE 802.11b.

30. The subsymbol prediction apparatus of claim 29, wherein the plurality of subsymbol types includes a $2^{nd}$ chip subsymbol type, a $4^{th}$ chip subsymbol type, and a $6^{th}$ chip subsymbol type.

31. The subsymbol prediction apparatus of claim 25, wherein
the first set of modulated symbol chips defines a first quantity of modulated symbol chips; and
wherein the second set of modulated symbol chips defines a second quantity of modulated symbol chips, the second quantity being less than the first quantity.

32. The subsymbol prediction apparatus of claim 31, wherein the first quantity is eight and the second quantity is selected from the group consisting of two, four and six.

33. The subsymbol prediction apparatus of claim 25, wherein said feeding means selectively feeds the second set of modulated symbol chips to said accepting means based on the predicted subsymbol type and one of a plurality of data rates.

34. The subsymbol prediction apparatus of claim 33, wherein said generating means selectively generates a subset of the set of correlator output signals based on the predicted subsymbol type and the data rate.

35. The subsymbol prediction apparatus of claim 25, wherein said accepting means comprises a power-saving means for generating one of a first set of correlator output signals and a second set of output signals based on a data rate associated with the second set of modulated symbol chips.

36. A receiver, comprising:
means for downconverting an inbound RF signal to recover a baseband signal defining a modulated symbol; and
a subsymbol prediction apparatus, comprising:
means for accepting a first set of modulated symbol chips in a first order, said accepting means including means for generating a set of correlator output signals based on said first set of modulated symbol chips;
means for selectively feeding a second set of modulated symbol chips within the baseband signal in a second order to said accepting means based on one of a plurality of predicted subsymbol types;
means for selectively generating a subset of the set of correlator output signals based on the one of a plurality predicted subsymbol types; and
means for identifying a maximum-valued correlator output signal from one of the set of correlator output signals or the subset of the set of correlator output signals, the maximum-valued correlator output signal corresponding to a predicted subsymbol of the predicted subsymbol type.

37. The receiver of claim 36, wherein the subsymbol prediction apparatus further comprises means for generating a third set of modulated symbol chips responsive to the predicted subsymbol.

38. The receiver of claim 37, wherein
the first set of modulated symbol chips defines a first quantity of modulated symbol chips;
wherein the second set of modulated symbol chips defines a second quantity of modulated symbol chips, the second quantity being less than the first quantity; and
wherein the third set of modulated symbol chips defines a third quantity of modulated symbol chips, the third quantity being equal to the second quantity.

39. The receiver of claim 38, wherein the first, second, and third sets of modulated symbol chips comprise respective sets of CCK-encoded chips.

40. The receiver of claim 39, wherein the respective sets of CCK-encoded chips are encoded in accordance with IEEE 802.11b.

41. The receiver of claim 40, wherein the plurality of subsymbol types includes a $2^{nd}$ chip subsymbol type, a $4^{th}$ chip subsymbol type, and a $6^{th}$ chip subsymbol type.

42. The receiver of claim 36, wherein
the first set of modulated symbol chips defines a first quantity of modulated symbol chips; and
wherein the second set of modulated symbol chips defines a second quantity of modulated symbol chips, the second quantity being less than the first quantity.

43. The receiver of claim 42, wherein the first quantity is eight and the second quantity is selected from the group consisting of two, four and six.

44. The receiver of claim 36, wherein said feeding means selectively feeds the second set of modulated symbol chips to said accepting means based on the predicted subsymbol type and one of a plurality of data rates.

45. The receiver of claim 44, wherein said generating means selectively generates a subset of the set of correlator output signals based on the predicted subsymbol type and the data rate.

46. The receiver of claim 36, wherein said accepting means comprises a power-saving means for generating one of a first set of correlator output signals and a second set of output signals based on a data rate associated with the second set of modulated symbol chips.

47. The receiver of claim 36, further comprising:
means for generating a third set of modulated symbol chips responsive to the predicted subsymbol; and
means for equalizing the second set of modulated symbol chips against the third set of modulated symbol chips.

48. A transceiver, comprising:
means for broadcasting an outbound signal bearing symbol modulated data; and
a receiver, comprising:
means for downconverting an inbound RF signal to recover a baseband signal defining a modulated symbol; and
a subsymbol prediction apparatus, comprising:
means for accepting a first set of modulated symbol chips in a first order, said accepting means including means for generating a set of correlator output signals based on said first set of modulated symbol chips;
means for selectively feeding a second set of modulated symbol chips within the baseband signal in a second order to said accepting means based on one of a plurality of predicted subsymbol types;
means for selectively generating a subset of the set of correlator output signals based on the one of a plurality predicted subsymbol types; and
means for identifying a maximum-valued correlator output signal from one of the set of correlator output signals or the subset of the set of correlator output signals, the maximum-valued correlator output signal corresponding to a predicted subsymbol of the predicted subsymbol type.

49. A subsymbol prediction method, comprising:
providing a correlator having an input to accept a first set of modulated symbol chips in a first order, said correlator to generate a set of correlator output signals based on said first set of modulated symbol chips;
feeding a second set of modulated symbol chips in a second order to the correlator based on a selected one of a plurality of predicted subsymbol types;
generating a subset of the set of correlator output signals based on the one of a pluarality selected one of the predicted subsymbol types; and
identifying a maximum-valued correlator output signal from one of the set of correlator output signals or the subset of the set of correlator output signals, the maximum-valued correlator output signal corresponding to a predicted subsymbol of the selected one of the predicted subsymbol types.

50. The subsymbol prediction method of claim 49, further comprising generating a third set of modulated symbol chips responsive to the predicted subsymbol.

51. The subsymbol prediction method of claim 50, wherein
the first set of modulated symbol chips defines a first quantity of modulated symbol chips;
wherein the second set of modulated symbol chips defines a second quantity of modulated symbol chips, the second quantity being less than the first quantity; and
wherein the third set of modulated symbol chips defines a third quantity of modulated symbol chips, the third quantity being equal to the second quantity.

52. The subsymbol prediction method of claim 51, wherein the first, second, and third sets of modulated symbol chips comprise respective sets of CCK-encoded chips.

53. The subsymbol prediction method of claim 52, wherein the respective sets of CCK-encoded chips are encoded in accordance with IEEE 802.11b.

54. The subsymbol prediction method of claim 53, wherein the plurality of subsymbol types includes a $2^{nd}$ chip subsymbol type, a $4^{th}$ chip subsymbol type, and a $6^{th}$ chip subsymbol type.

55. The subsymbol prediction method of claim 49, wherein
the first set of modulated symbol chips defines a first quantity of modulated symbol chips; and
wherein the second set of modulated symbol chips defines a second quantity of modulated symbol chips, the second quantity being less than the first quantity.

56. The subsymbol prediction method of claim 55, wherein the first quantity is eight and the second quantity is selected from the group consisting of two, four and six.

57. The subsymbol prediction method of claim 49, wherein said feeding comprises feeding the second set of modulated symbol chips to the correlator based on the selected one of the predicted subsymbol types and one of a plurality of data rates.

58. The subsymbol prediction method of claim 57, wherein said generating comprises generating a subset of the set of correlator output signals based on the selected one of the predicted subsymbol types and the data rate.

59. The subsymbol prediction method of claim 49, wherein the correlator includes a power-saving correlator to generate one of a first set of correlator output signals and a second set of output signals based on a data rate associated with the second set of modulated symbol chips.

60. The subsymbol prediction method of claim 49, further comprising downconverting an RF signal to recover a baseband signal including the second set of modulated symbol chips.

61. The subsymbol prediction method of claim 60, further comprising:
generating a third set of modulated symbol chips responsive to the predicted subsymbol; and
equalizing the second set of modulated symbol chips against the third set of modulated symbol chips.

62. A computer program product comprising computer readable program code causing an information processor in support of a correlator to perform at least one of the following steps, the correlator having an input to accept a first set of modulated symbol chips in a first order to generate a set of correlator output signals based on the first set of modulated symbol chips, the steps comprising:
feeding a second set of modulated symbol chips in a second order to the correlator based on a selected one of a plurality of predicted subsymbol types;
generating a subset of the set of correlator output signals based on the one of a plurality selected one of the predicted subsymbol types; and
identifying a maximum-valued correlator output signal from one of the set of correlator output signals or the subset of the set of correlator output signals, the maximum-valued correlator output signal corresponding to a predicted subsymbol of the selected one of the predicted subsymbol types.

63. The product of claim 62, further comprising computer readable program code causing the information processor to perform the step of generating a third set of modulated symbol chips responsive to the predicted subsymbol.

64. The product of claim 63, wherein
the first set of modulated symbol chips defines a first quantity of modulated symbol chips;

wherein the second set of modulated symbol chips defines a second quantity of modulated symbol chips, the second quantity being less than the first quantity; and wherein the third set of modulated symbol chips defines a third quantity of modulated symbol chips, the third quantity being equal to the second quantity.

65. The product of claim 64, wherein the first, second, and third sets of modulated symbol chips comprise respective sets of CCK-encoded chips.

66. The product of claim 65, wherein the respective sets of CCK-encoded chips are encoded in accordance with IEEE 802.11b.

67. The product of claim 66, wherein the plurality of subsymbol types includes a $2^{nd}$ chip subsymbol type, a $4^{th}$ chip subsymbol type, and a $6^{th}$ chip subsymbol type.

68. The product of claim 62, wherein the first set of modulated symbol chips defines a first quantity of modulated symbol chips; and wherein the second set of modulated symbol chips defines a second quantity of modulated symbol chips, the second quantity being less than the first quantity.

69. The product of claim 68, wherein the first quantity is eight and the second quantity is selected from the group consisting of two, four and six.

70. The product of claim 62, wherein said feeding step comprises feeding the second set of modulated symbol chips to the correlator based on the selected one of the predicted subsymbol types and one of a plurality of data rates.

71. The product of claim 70, wherein said generating step comprises generating a subset of the set of correlator output signals based on the selected one of the predicted subsymbol types and the data rate.

72. The product of claim 62, wherein the correlator includes a power-saving correlator to generate one of a first set of correlator output signals and a second set of output signals based on a data rate associated with the second set of modulated symbol chips.

73. The product of claim 62, wherein the correlator forms part of the information processor.

74. The product of claim 62, wherein the correlator is formed independently of and communicatively coupled to the information processor.

75. The product of claim 62, further comprising computer readable program code causing the information processor to perform the step of downconverting an RF signal to recover a baseband signal including the second set of modulated symbol chips.

76. The product of claim 75, further comprising computer readable program code causing the information processor to perform the following steps:

generating a third set of modulated symbol chips responsive to the predicted subsymbol; and equalizing the second set of modulated symbol chips against the third set of modulated symbol chips.

* * * * *

UNITED STATES PATENT AND TRADEMARK OFFICE
CERTIFICATE OF CORRECTION

PATENT NO.       : 7,187,730 B1
APPLICATION NO.  : 10/252138
DATED            : March 6, 2007
INVENTOR(S)      : Guorong Hu et al.

It is certified that error appears in the above-identified patent and that said Letters Patent is hereby corrected as shown below:

| | |
|---|---|
| Title Page: | Art on attached 1449 missing from Title Page References |
| Drawings: | Delete sheet 5 of 13 containing Dwg. Fig. 9, and replace with Dwg. Fig. 9. (Attached) |
| | Delete sheet 11 of 13 containing Dwg. Fig. 15, and replace with Dwg. Fig. 15. (Attached) |
| Column 1, Lines 42-43: | Delete Equation (1) on patent and insert equation (1) (per the attached sheet) |
| Column 4, Line 13: | Delete "the including" after "including" |
| Column 5, Line 1: | Insert --502-- after "modulator" |
| Column 6, Lines 15, 16, 19 and 20: | Delete Equation (5) on patent and insert equation (5) (per the attached sheet) |
| Column 7, Line 57: | Delete "d2-3" and insert --d2-d3-- |
| Column 9, Lines 34 & 51: | Delete "correlator" and insert --correlation unit-- |
| Column 9, Line 39: | Delete "1500" and insert --1505-- |
| Column 9, Line 45: | Delete "correlation unit" and insert --correlator 1505-- |
| Column 9, Line 51: | Delete "Mb" and insert --Mbps-- |
| Column 9, Line 56: | Insert --1530-- after "unit" |
| Column 10, Line 4: | Insert --while-- after "$C_4$"" |
| Column 10, Line 4: | Delete "to" after "required" |
| Column 11, Line 4: | Delete "5.5M" and insert --5.5 Mbps-- |
| Column 12, Line 28: | Insert --1530-- after "unit" |
| Column 12, Line 32: | Delete "[[please confirm]]" |
| Column 14, Line 45: | Delete "cTo" and insert --c'. To-- |
| Column 14, Line 57: | Equation 22 – first column, delete "13" and insert -- -13-- |
| Column 14, Line 60: | Equation 22 – first column, delete "16" and insert -- -16 -- |
| Column 15, Line 22: | Insert --1530-- after "unit" |
| Column 16, Line 50: | Insert --of-- after "plurality" (10-26-06 Ex. Amd.) |
| Column 16, Line 56: | Delete "type" and insert --types-- (10-26-06 Ex. Amd.) |
| Column 17, Line 54: | Insert --of-- after "plurality" (10-26-06 Ex. Amd.) |
| Column 17, Line 60: | Delete "type" and insert --types-- (10-26-06 Ex. Amd.) |
| Column 18, Line 64: | Insert --of-- after "plurality" (10-26-06 Ex. Amd.) |
| Column 19, Line 3: | Delete "type" and insert --types-- (10-26-06 Ex. Amd.) |
| Column 19, Line 15: | Insert --of-- after "plurality" (10-26-06 Ex. Amd.) |
| Column 19, Line 21: | Delete "type" and insert --types-- (10-26-06 Ex. Amd.) |
| Column 20, Line 19: | Insert --of-- after "plurality" (10-26-06 Ex. Amd.) |
| Column 20, Line 25: | Delete "type" and insert --types-- (10-26-06 Ex. Amd.) |

UNITED STATES PATENT AND TRADEMARK OFFICE
CERTIFICATE OF CORRECTION

PATENT NO. : 7,187,730 B1
APPLICATION NO. : 10/252138
DATED : March 6, 2007
INVENTOR(S) : Guorong Hu et al.

It is certified that error appears in the above-identified patent and that said Letters Patent is hereby corrected as shown below:

Column 21, Line 27:     Insert --of-- after "plurality" (10-26-06 Ex. Amd.)
Column 21, Line 33:     Delete "type" and insert --types-- (10-26-06 Ex. Amd.)
Column 21, Line 43:     Delete "plurality" and insert --plurality--
Column 21, Line 43:     Insert --of-- after "plurality" (10-26-06 Ex. Amd.)
Column 22, Line 53:     Insert --of-- after "plurality" (10-26-06 Ex. Amd.)

Delete Equation (1) on patent and insert the following Equation (1) from Amendment
--

$$c = \{e^{j(\varphi_1+\varphi_2+\varphi_3+\varphi_4)}, e^{j(\varphi_2+\varphi_3+\varphi_4)}, e^{j(\varphi_1+\varphi_2+\varphi_4)}, -e^{j(\varphi_1+\varphi_4)}, e^{j(\varphi_1+\varphi_2+\varphi_3)}, e^{j(\varphi_1+\varphi_3)}, -e^{j(\varphi_1+\varphi_2)}, e^{j(\varphi_1)}\} \quad (1)$$

--

Delete Equation (5) on patent and insert the following Equation (5) from Application $$R = \begin{bmatrix} c0 \\ c1 \\ c2 \\ -c3 \\ c4 \\ c5 \\ -c6 \\ c7 \end{bmatrix}^T \begin{bmatrix} e^{j(\varphi_2+\varphi_3+\varphi_4)} \\ e^{j(\varphi_3+\varphi_4)} \\ e^{j(\varphi_2+\varphi_4)} \\ e^{j\varphi_4} \\ e^{j(\varphi_2+\varphi_3)} \\ e^{j\varphi_3} \\ e^{j\varphi_2} \\ 1 \end{bmatrix}^* = \begin{bmatrix} c0 \\ c2 \\ c1 \\ -c3 \\ c4 \\ -c6 \\ c5 \\ c7 \end{bmatrix}^T \begin{bmatrix} e^{j(\varphi_2+\varphi_3+\varphi_4)} \\ e^{j(\varphi_2+\varphi_4)} \\ e^{j(\varphi_3+\varphi_4)} \\ e^{j\varphi_4} \\ e^{j(\varphi_2+\varphi_3)} \\ e^{j\varphi_2} \\ e^{j\varphi_2} \\ 1 \end{bmatrix}^* \quad (5)$$

Signed and Sealed this

Sixteenth Day of October, 2007

JON W. DUDAS
*Director of the United States Patent and Trademark Office*